US00RE43340E

(19) United States
(12) Reissued Patent
Heinz et al.

(10) Patent Number: US RE43,340 E
(45) Date of Reissued Patent: May 1, 2012

(54) METHOD FOR OPERATING AN ETHERNET OPTICAL AREA NETWORK ("EOAN") OVER ONE OR MORE METROPOLITAN AREAS

(75) Inventors: Patrick Heinz, Burnsville, MN (US); Christopher Scheper, New Miami, OH (US); David Leary, Cincinnati, OH (US)

(73) Assignee: 511 Technologies, Inc., Marshall, TX (US)

(21) Appl. No.: 12/806,733

(22) Filed: Aug. 19, 2010

Related U.S. Patent Documents

Reissue of:
(64) Patent No.: 7,415,209
Issued: Aug. 19, 2008
Appl. No.: 11/656,340
Filed: Jan. 22, 2007

U.S. Applications:
(63) Continuation of application No. 10/001,524, filed on Oct. 24, 2001, now Pat. No. 7,167,648.

(51) Int. Cl.
*H04B 10/20* (2006.01)
*H04J 14/00* (2006.01)
*H04L 12/28* (2006.01)

(52) U.S. Cl. ..... 398/58; 398/59; 370/404

(58) Field of Classification Search ..... 398/46, 398/58–59, 66, 71–72, 78–79, 82, 118, 177; 370/404
See application file for complete search history.

(56) References Cited

U.S. PATENT DOCUMENTS 4,063,220 A * 12/1977 Metcalfe et al. ..... 370/462
5,050,164 A * 9/1991 Chao et al. ..... 398/67

(Continued)

FOREIGN PATENT DOCUMENTS

EP 335562 * 10/1989

(Continued)

OTHER PUBLICATIONS

"Building New-Generation Metropolitan Area Networks", White Paper, Extreme Networks, 2000.*

(Continued)

*Primary Examiner* — Leslie Pascal
(74) *Attorney, Agent, or Firm* — Loudermilk & Associates

(57) ABSTRACT

An Ethernet Optical Area Network (EOAN) system, and methods for implementing and using such an EOAN system, are disclosed. The EOAN system may be used to improve the speed and reliability of data communications networks for small to medium-sized companies in metropolitan area networks. The EOAN system provides end-to-end Ethernet protocol, enabling professionals to have high-speed data communications in real time. The EOAN system may be generally utilized for improving data communications between branch offices, home offices, campuses, and remote sites for a wide variety of industries. The present invention preferably includes a fiber optic ring, Network Operation Center (NOC), NOC architecture components, existing client equipment, and one or more Free Space Optic (FSO) devices, microwave communication technology, and/or data switching platforms to implement high-speed Ethernet-based connections such as within a specified metropolitan area. The preferred EOAN system preferably integrates a plurality of FSO, microwave, and/or fiber optic technologies with Ethernet protocol (Fast Ethernet, Gigabit Ethernet, 10 Gigabit, etc.) to provide data connection services.

41 Claims, 10 Drawing Sheets

U.S. PATENT DOCUMENTS

| | | | | |
|---|---|---|---|---|
| 5,247,381 | A * | 9/1993 | Olmstead et al. | 398/58 |
| 5,647,035 | A * | 7/1997 | Cadeddu et al. | 385/24 |
| 6,067,179 | A * | 5/2000 | Roberts et al. | 398/97 |
| 6,104,700 | A * | 8/2000 | Haddock et al. | 370/235 |
| 6,185,023 | B1 * | 2/2001 | Mizrahi | 398/9 |
| 6,198,556 | B1 * | 3/2001 | Mizrahi | 398/85 |
| 6,359,729 | B1 * | 3/2002 | Amoruso | 359/341.1 |
| 6,359,882 | B1 * | 3/2002 | Robles et al. | 370/389 |
| 6,366,584 | B1 * | 4/2002 | Gulliford et al. | 370/403 |
| 2002/0013858 | A1 * | 1/2002 | Anderson | 709/245 |
| 2002/0191250 | A1 * | 12/2002 | Graves et al. | 359/128 |

FOREIGN PATENT DOCUMENTS

| | | | |
|---|---|---|---|
| WO | 9810566 | * | 3/1998 |
| WO | 9962224 | * | 12/1999 |
| WO | WO 0004660 | | 1/2000 |
| WO | WO 0124134 | | 4/2001 |
| WO | 0004660 | * | 1/2009 |
| WO | 0124134 | * | 4/2011 |

OTHER PUBLICATIONS

"Fiber Optic Infastructure", Wite Paper, ExtremeNetworks, 2000.*

Held, Gilbert, "Understanding Data Communication", 6th Edition, Indianapolis; New Riders, 1999, Ch. 7, pp. 263-286 and Ch. 11, pp. 414-427.*

IEEE;Standaards for Local and Metropolitan Area Networks Overview and Architecture; Dec. 31, 1990.*

"Policy Based Quality of Service for Service Providers", White Paper, Extreme Networks, 2000.*

Ramswami, R. et al, "Optical Networks: A Practice Perpective", New York, Morgan Kaufman Publishers, 1998.*

IEEE: Standard for Local and Metropolitan Area Networks: Overview and Architecture, Dec. 31, 1990.

Ramaswami, R. and Kumar N. Sivarajan, "Optical Networks: A Practical Perpective", New York, Morgan Kaufmann Publishers, 1998.

* cited by examiner

METHOD FOR OPERATING AN ETHERNET OPTICAL AREA NETWORK ("EOAN") OVER ONE OR MORE METROPOLITAN AREAS

Matter enclosed in heavy brackets [ ] appears in the original patent but forms no part of this reissue specification; matter printed in italics indicates the additions made by reissue.

This application is a continuation of U.S. Application Ser. No. 10/001,524, filed Oct. 24, 2001, now U.S. Pat. No. 7,167,648.

FIELD OF THE INVENTION

The invention generally relates to the fields of voice and data communications, specifically metropolitan area networks, Ethernet networks and fiber optic rings. More particularly, the present invention relates to an Ethernet optical area network system and methods for providing Ethernet protocol end-to-end and uses thereof.

BACKGROUND OF THE INVENTION

Data communications is one of the fastest growing segments of the telecommunications industry. Bandwidth, speed, latency, reliability, security, and Quality of Service (QoS) remain paramount concerns for data communications networks. However, current data communication networks connect to and often include the public telephone system, which was originally designed for analog (voice) communications. The public telephone system places inherent limits on the development of efficient, high-speed, digital data transmissions.

Currently data routing through a central switching office occurs across a local loop, which often consists of Unshielded Twisted Pair (UTP) copper cable. As is understood by one skilled in the art, UTP cable is a low-frequency transmission media and has a limited frequency range of approximately 300 Hz to 3300 Hz. While data rates of 100 Mbps are possible for short distances across UTP cable, 56 Kbps generally is considered the standard rate for analog telephone lines. Thus, the transmission media most often used by the central switching offices of local telephone companies is not conducive to high-speed data transmission.

While Local Area Networks (LANs) within company offices can operate at speeds measured in Gigabits per second (Gbps), data transmissions between offices over Wide Area Networks (WANs) and Metropolitan Area Networks (MANs) are subject to the speed constraints of the so-called "last mile." The "last mile" refers to the physical copper connection of local access lines between the central switching office of a telephone company and an end-user, lines that typically are controlled by RBOCs (Regional Bell Operating Companies) and other telecommunications companies. These companies have invested billions of dollars in building the "last mile" with UTP cable, but such technology now acts as a bottleneck to the transmission of large data files and streaming media between offices outside the LAN. Currently there are few incentives for the RBOCs and other telecommunications companies to rapidly implement new technology solutions and replace this installed copper base of UTP.

Bandwidth is also a defining element in allowing state-of-the-art applications to fully exploit their capabilities. When data is sent to and from branch offices, bandwidth is critical to making the files useful. As applications grow more complex, the various types of files (data, graphic, audio, video, etc.) have tended to grow larger and larger. For example, medical networks require high-speed data rates to achieve timely and efficient data communications between separate facilities, such as hospitals, clinics and research institutes, but UTP cable does not transmit well over anything but very short distances. Currently, data from most medical equipment, such as a Magnetic Resonance Imaging (MRI) system, cannot be efficiently transmitted between separate facilities because the data files (which frequently include numerous images) are typically too large. For instance, an MRI system, which may be used to help diagnose tumors in a cancer patient, requires specialized software (such as what is known as "syngo") for high-resolution imaging and produces image files in a standard format (such as a DICOM file format) that may include hundreds of image files. The problem is the present bandwidth of most medical intranets cannot achieve the necessary speeds for efficient data transmission between facilities outside of a LAN environment.

Remote hosting has also been restricted by the limitations of the public telephone network. Typically, an Internet Service Provider (ISP) or other web hosting company provides a server for back-up service. Connectivity beyond the physical limitations of the 10/100 Base-T Ethernet cables is available through dedicated lines, dial-up access, etc., but connection speeds drop dramatically once outside the Ethernet network. For example, speeds within the LAN using Ethernet vary from 10 Mbps to 10 Gbps, while speeds outside the LAN on UTP cable vary from 56 Kbps to 45 Mbps. The legacy transmission media and its protocols of the public telephone system are the main reasons for the slower data rates.

The present invention attempts to address such limitations of current data communications between WANs and MANs with Ethernet Optical Area Network (EOAN) systems. Such EOAN systems extend the LAN infrastructure of companies and organizations beyond the physical boundaries of the office or campus. The present invention is based on the Ethernet protocol, which is the current standard transmission protocol for LANs. The present invention provides routerless and server-less network access to outside networks at the same speed at which a computer inside an office is connected to a LAN. Such EOAN systems, for example, will allow businesses within the same metropolitan area to create private networks with unparalleled speed and ease of management at a fraction of the present cost.

EOAN systems provide companies and organizations within the same metropolitan area with high-speed data communications via Fast Ethernet, Gigabit Ethernet, and 10 Gigabit Ethernet. In accordance with the present invention, EOAN systems enable companies and organizations to communicate with each other at data rates that are potentially more than 80 times current bandwidth connections. The present invention can attain such high-speed data rates by combining wireless connections, fiber optics, and Ethernet capable switches to create a network that has the ability to deliver Terabits of information over metropolitan area networks and that is cost-effective for small to medium-sized businesses. The interconnectivity of EOAN systems provides data transport for a variety of services, which may include private network security, satellite office interconnectivity, carrier grade Voice over IP (VoIP), ultra high-speed Internet access, real-time remote imaging, high quality video conferencing, real-time distance learning, cooperative data environments, etc.

SUMMARY OF INVENTION

The present invention provides what is referred to herein as Ethernet Optical Area Network (EOAN) system, and methods for implementing and using such an EOAN system. In accordance with the present invention, an EOAN system is provided that may be used to improve the speed and reliability of data communications networks for small to medium-sized companies in metropolitan area networks. An EOAN system provides end-to-end Ethernet protocol, enabling professionals to have high-speed data communications in real time. As will be appreciated, the present invention may be generally utilized for improving data communications between branch offices, home offices, campuses, and remote sites for a wide variety of industries. The present invention preferably includes a fiber optic ring, Network Operation Center (NOC), NOC architecture components, existing client equipment, and one or more Free Space Optic (FSO) devices, microwave communication technology, and/or data switching platforms to implement high-speed Ethernet-based connections within a specified metropolitan area. The present invention preferably integrates a plurality of FSO, microwave, and/or fiber optic technologies with Ethernet protocol (Fast Ethernet, Gigabit Ethernet, 10 Gigabit, etc.) to provide data connection services that will enable users to connect at rates that may be potentially more than 80 times the current, conventional bandwidth connections.

An object of the present invention is to provide a system and methods for data communications, which integrate FSO, microwave, and fiber optic technologies with Ethernet protocol (Fast Ethernet, Gigabit Ethernet, 10 Gigabit, etc.) in accordance with the present invention.

Another object is to provide a system and methods for delivering end-to-end Ethernet protocol (Fast Ethernet, Gigabit Ethernet, 10 Gigabit, etc.) between a plurality of users in separate locations but on the same optical network in accordance with the present invention.

A further object is to provide a system and methods for high-speed data communications for satellite office interconnectivity in real time in accordance with the present invention.

Still a further object of the present invention to provide a system and methods for high-speed data communications with network-wide Internet access, real-time remote imaging, carrier grade VoIP, high quality video conferencing, and/or real-time distance learning in accordance with the present invention.

Yet another object is to provide a system and methods for high-speed data communications and interconnectivity for a plurality of networks (i.e., legal, medical, insurance, etc.) in accordance with the present invention.

BRIEF DESCRIPTION OF THE DRAWINGS

The present invention may be more fully understood by a description of certain preferred embodiments in conjunction with the attached drawings in which.

DETAILED DESCRIPTION OF PREFERRED EMBODIMENTS

The present invention will now be described in greater detail with reference to particular preferred and alternative embodiments. Such description is for a more complete understanding of the background, utility and application of the present invention, and is without being bound by any particular theory or the like.

Figure 1A:
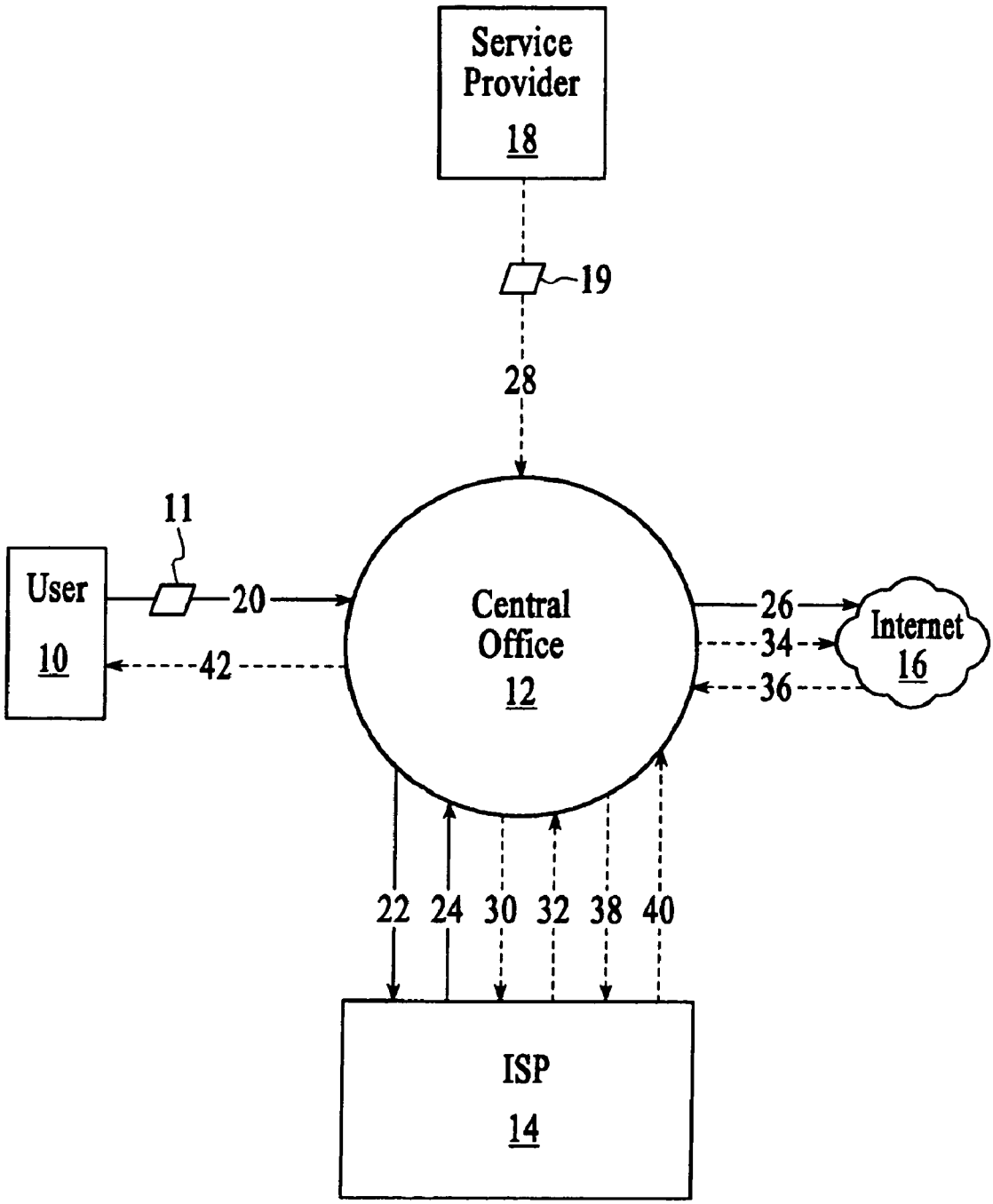
FIG.1A (PRIOR ART)
FIG. 1A is a diagram illustrating a conventional network topology for data communications via a central switching office of a local telephone company.

FIG. 1A is a diagram illustrating a conventional network topology for data communications using a central switching office of a local telephone company. In accordance with current conventions, user 10 is coupled to central office 12, which is connected to ISP 14, Internet 16, and service provider 18. Typically user 10 is a single location business without a Dedicated Access Line (DAL) such as a T-1 connection. Central office 12 is a central switching office of a local telephone company. ISP 14 is an Internet Service Provider that provides a variety of utilities and services to users (such as user 10, etc.) and is connected to one or more Network Access Points (NAPs) typically on the digital backbone of the Internet. Service provider 18 preferably is a company that provides data and/or services to a plurality of users (such as user 10, etc.) via the Internet (such as Internet 16). Within such a conventional network, user 10 may access Internet 16 and send data to service provider 18 (and vice versa).

As illustrated in FIG. 1A, in order for user 10 to transmit/receive data to and from Internet 16, user 10 must connect to ISP 14 via central office 12. For example, in accordance with current conventions, user 10 transmits data 11 via UTP cable 20 (e.g., providing a standard telephone connection at up to 56 Kbps, etc.) to central office 12, which routes data 11 via UTP cable 22 (e.g., providing large bandwidth connection via T-1 at 1.54 Mbps, etc.) to ISP 14, which then routes data 11 back via UTP cable 24 to central office 12, which then transmits data 11 via fiber optic cable 26 (e.g., providing carrier class connection via OC-12 at 622 Mbps, etc.) to Internet 16. Thus, as noted in the example, a minimum of four hops across the network generally is required for data 11 of user 10 to reach Internet 16.

Data communications through a central switching office of a local telephone company (such as central office 12) poses several limitations to high-speed data transmission. For example, in accordance with current conventions illustrated in FIG. 1A, central office 12 typically uses UTP cable for data routing across a local loop. As will be understood by one skilled in the art, UTP cable has a frequency range basically limited to approximately 300 Hz to 3300 Hz. In certain circumstances (such as for single location businesses without Dedicated Access Lines or DALs, etc.), digital signals from user 10 must be converted with a modem to analog signals before being transmitted to central office 12. For instance, user 10 modulates (i.e., converts) data 11 and transmits data 11 via UTP cable 20 to central office 12, which routes data 11 via UTP cable 22 to ISP 14, wherein ISP 14 receives data 11, demodulates data and routes it via UTP cable 24 back to central office 12, which then routes data 11 via fiber optic cable 26 to Internet 16.

As further illustrated in FIG. 1A, service provider 18 may transmit data to user 10 and vice versa. In order for service provider 18 to transmit data and provide services to user 10, for example, data of service provider 18 must make eight hops across the network. Accordingly, service provider 18 must transmit data 19 to central office 12, which routes data 19 to ISP 14, which routes data 19 back to central office 12, which then transmits data 19 to Internet 16, which sends data back to central office 12, which routes data 19 to ISP 14, which routes data 19 back to central office 12, which finally routes data 19 to user 10. Accordingly, eight hops are required for service provider 18 to send data 19 to user 10. Moreover, the data must be converted several times during the process. Such data conversions not only slow data transmission, but also may cause jitter in audio communications because of the latency. For example, service provider 18 preferably transmits data 19 via UTP cable 28 (e.g., providing large bandwidth connection via T-1 at 1.54 Mbps) to central office 12, which routes data 19 via UTP cable 30 (e.g., providing T-1 connection at 1.54 Mbps) to ISP 14, wherein ISP 14 receives data 19 through one or more servers that route data 19 via UTP cable 32 (e.g., providing T-1 connection at 1.54 Mbps) to central office 12, which then routes data 19 via fiber optic cable 34 (e.g., providing OC-12 connection at 622 Mbps) to Internet 16. (As will be understood by one skilled in the art, Internet 16 may route data across the NAPs of the digital backbone of the Internet through multiple Metropolitan Area Exchanges (MAEs) back to central office 12.) Accordingly, Internet 16 then routes data 19 via fiber optic cable 36 (e.g., providing OC-12 connection at 622 Mbps) to central office 12, which routes data 19 via UTP cable 38 (e.g., providing T-1 connection at 1.54 Mbps) to ISP 14, which then transmits data 19 via UTP cable 40 to central office 12, which routes data 19 via UTP cable 42 (e.g., providing a standard telephone connection at a rate of up to 56 Kbps) to user 10.

Figure 1B:
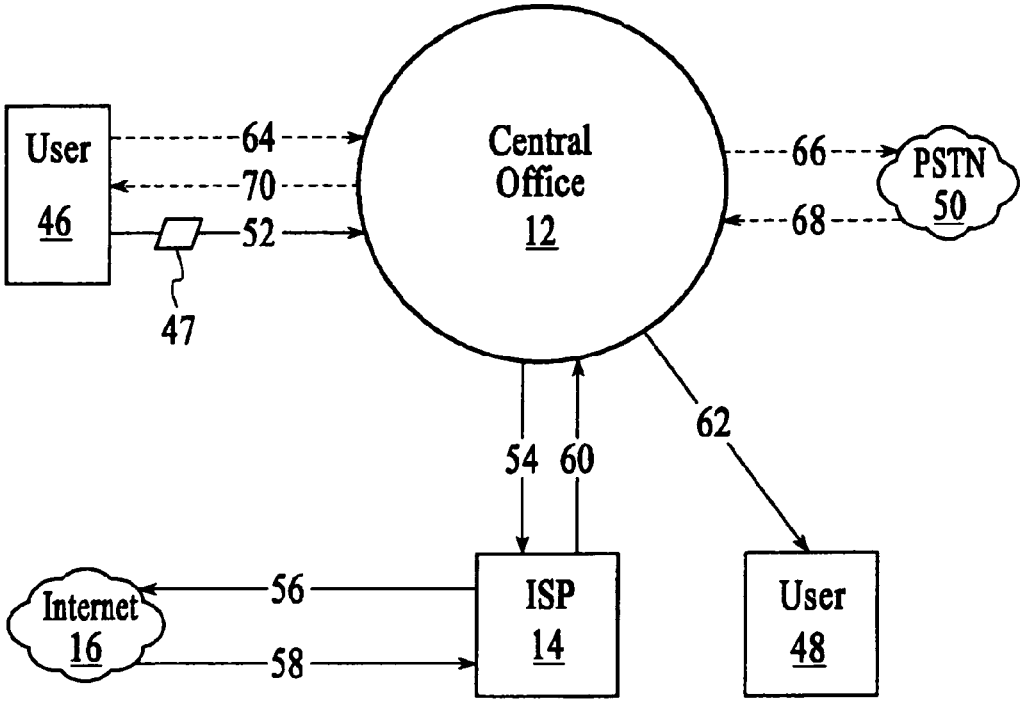
FIG.1B (PRIOR ART)
FIG. 1B is a diagram illustrating an alternate embodiment of a conventional network topology for voice and data communications via a central switching office of a local telephone company.

FIG. 1B is a diagram illustrating an alternate embodiment of a conventional network topology for voice and data communications using a central switching office of a local telephone company. Such a conventional network provides separate voice and data communications across the Public Switched Telephone Network (PSTN) and the Internet via a central switching office of a local telephone company. In accordance with current conventions, user 46 connects to central office 12, which is coupled to ISP 14, user 48, and PSTN 50. Preferably users 46-48 are single location businesses without a Dedicated Access Lines (DALs), and central office 12 is a central switching office of a local telephone company. ISP 14 preferably is an Internet Service Provider that provides a variety of utilities and services to a plurality of users (such as users 46-48) and is connected to one or more NAPs on the digital backbone of the Internet. PSTN 50 preferably includes local, long distance, and international telephone companies (such as RBOCs, etc.) and their Local Access and Transport Areas (LATAs). Within such a conventional network, user 46 may place a telephone call via central office 12 through PSTN 50 and may transmit data through central office 12 to user 48.

As illustrated in FIG. 1B, in order for user 46 to transmit/receive data to and from another user (such as user 48), user 46 must have access to an ISP (such as ISP 14) via a central switching office of a local telephone company (such as central office 12). For example, in accordance with current conventions, user 46 transmits data 47 via UTP cable 52 (e.g., providing a standard telephone connection at a rate of up to 56 Kbps) to central office 12, which routes data 47 across UTP cable 54 (e.g., providing T-1 connection at 1.54 Mbps, etc.) to a router at ISP 14, which then routes data 47 via fiber optic cable 56 (e.g., providing OC-3 connection at 155 Mbps, etc.) to Internet 16, which routes data 47 back via fiber optic cable 58 (e.g., providing OC-3 connection at 155 Mbps, etc.) to ISP 14, which sends data 47 via UTP cable 60 (e.g., providing T-1 connection at 1.54 Mbps, etc.) to central office 12, which then sends data 47 via UTP cable 62 (e.g., providing a standard telephone connection at a rate of up to 56 Kbps, etc.) to user 48. A minimum of six hops across the network typically is required for data 47 to reach user 48 from user 46.

Moreover, when data (such as data 47) is sent from one or more users (such as user 46) via the central office (such as central office 12) to an ISP (such as ISP 14), for instance, the data is typically modulated into an analog signal before being transmitted to the central office. Likewise, for example, when data (such as data 47) is being sent from ISP 14 to user 48, the data must be modulated by the ISP before being transmitted to the user (such as user 48), who must in turn demodulate (via CSU/DSU) the data upon receipt. Thus, six hops and multiple data conversions typically are required for one user to send data to another user.

As further illustrated in FIG. 1B, a user (such as user 46) can place a local or long distance call separately through a central switching office of a local telephone company (such as central office 12). In spite of recent trends toward voice/data convergence, voice and data communications often remain separated for efficiency of high-speed transmissions across WANs and MANs. For instance, user 46 makes a telephone call and sends a signal via analog line 64 to central office 12, which routes the signal via analog line 66 to PSTN 50, which then makes the connection and sends back a signal via analog line 68 to central office 12, which routes signal via analog line 70 to user 46 to complete the connection.

Although FIGS. 1A and 1B illustrate a single central office for background discussion purposes, it will be appreciated that such conventional network topologies utilize numerous interconnected central offices with similar limitations and operational inefficiencies.

Figure 2:
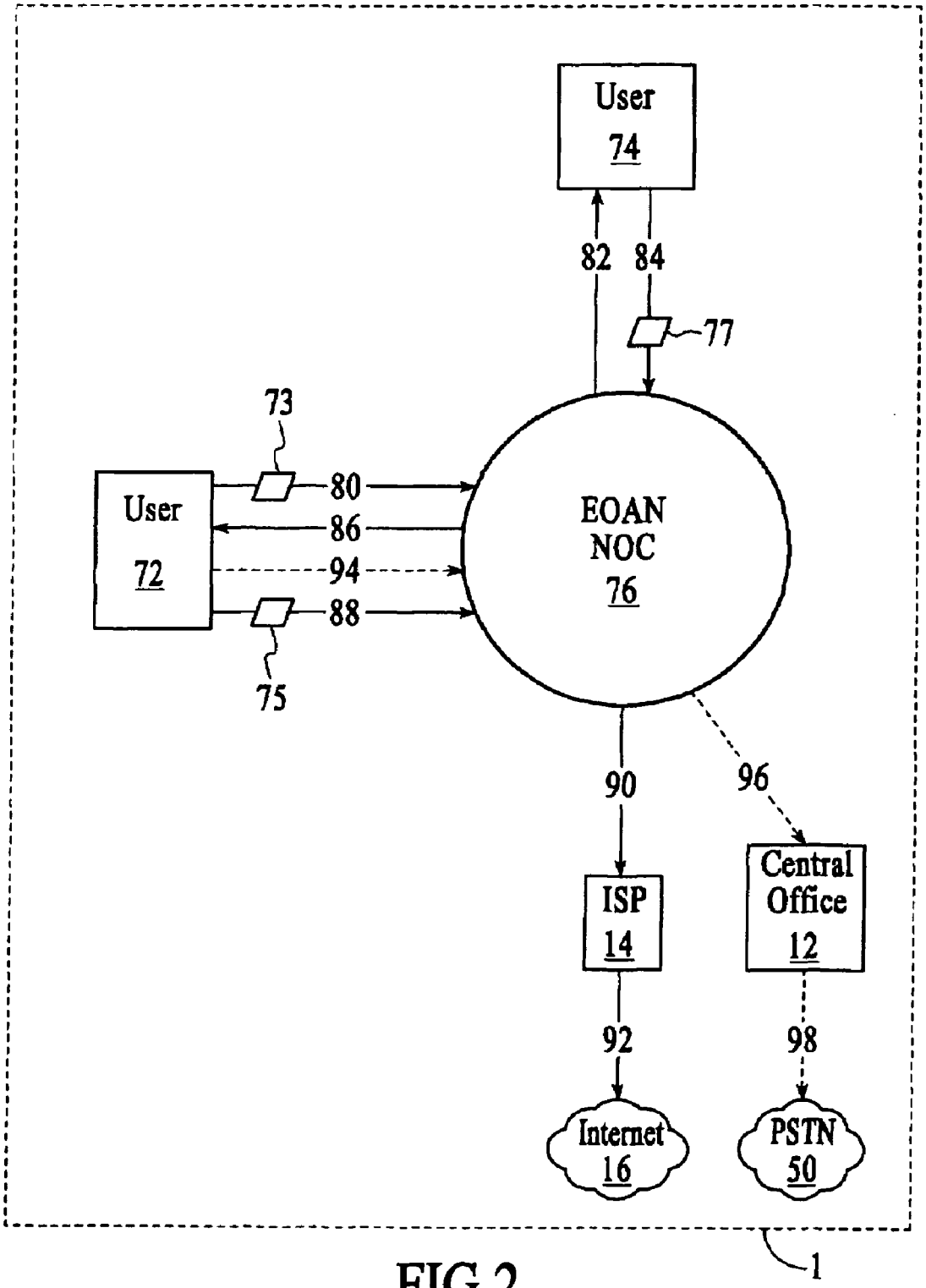
FIG. 2 is a diagram illustrating a network topology for an Ethernet Optical Area Network (EOAN) system in accordance with one preferred embodiment of the present invention.

FIG. 2 is a diagram illustrating an exemplary embodiment of a network topology for an Ethernet Optical Area Network (EOAN) system in accordance with the present invention. In a preferred embodiment, EOAN system 1 is a private data network (incorporating voice communications) that provides network connectivity with the geographical range of a MAN, but primarily uses Ethernet protocols for data communications. Accordingly, it should be noted that data preferably includes a plurality of data types (data, graphic, audio, video, etc.) that may be suitable for data communication via Ethernet protocols. Moreover, data communications as used hereinafter may incorporate voice communications and virtually all types of data. In accordance with the present invention, EOAN system 1 utilizes standard, high-speed Ethernet protocols (e.g., Fast Ethernet, Gigabit Ethernet, 10 Gigabit Ethernet, etc.), which allows for internetworking of data transmission devices. As will be understood by one skilled in the art, these protocols enable very high-speed data communications with real-time streaming media.

In accordance with the present invention, user 72 is preferably connected to EOAN NOC 76, which is a Network Operations Center (NOC) that provides data switching and management functions. (EOAN NOC. 76 will be described in further detail in connection with FIG. 4.) Users 72-74 preferably are single location businesses, whereas central office 12 is a central switching office of a local telephone company. It should be noted that users refer to clients and their existing technology (which may include, for example, Ethernet switches, hubs, servers, and other devices necessary for the client's LAN/data network). ISP 14 provides a variety of utilities and services to a plurality of users (i.e., user 72, user 74, etc.) and is connected to one or more NAPs on the digital backbone of the Internet. PSTN 50 preferably includes local, long distance, and international telephone companies and their LATAs. Data (such as data 73) may include a plurality of data files (audio, video, graphic, data, etc.) and can be transmitted/received in a plurality of protocols (e.g., Ethernet, ATM, etc., although in preferred embodiments an Ethernet-based protocol is used) via a plurality of transmission media (such as FSO, optical signals, microwaves, infrared light, etc.) and physical pathways (such as UTP, fiber optic cable, etc.). Optical network connections 80-88 and 94 preferably consist of a plurality of types of physical pathways and transmission media (such as FSO, fiber optic cable, microwaves, infrared light, etc.) that may be used to transmit/receive data. Fiber optic cable 90 (e.g., OC-3, OC-12, etc.) is a conventional fiber optic cable. NAP connection 92 provides a connection to a Network Access Point on the digital backbone at broadband speeds (e.g., DS3, OC-3, OC-12, etc.). Network connection 96 preferably includes a wide range of types of transmission media that may be used to transmit/receive data preferably via a suitable telecommunications protocol (including UTP cable, FSO, fiber optic cable, microwaves, infrared light, etc.), and preferably is a fiber optic connection using a telecommunications protocol such as OC-3 to enable a suitable, high speed connection between EOAN NOC 76 and central office 12. PSTN backbone connection 98 preferably provides a connection to a backbone of the Public Switched Telephone Network (PSTN) at a plurality of speeds.

In accordance with the present invention, user 72 is coupled via an optical network connection to EOAN NOC 76, which in turn is connected to central office 12, user 74, and ISP 14. Unlike conventional MAN topologies, user 72 can transmit data 73 via Ethernet protocol through EOAN NOC 76 to user 74 with only two hops across the network. In the process, data 73 of user 72 does not have to leave the local EOAN. Moreover, user 72 can access Internet 16 via ISP 14 in three hops or can place a telephone call through PSTN 50 via central office 12 in three hops at very high speeds.

As illustrated in FIG. 2, unlike conventional MAN and WAN-based networks, a user (e.g., user 72) preferably transmits data (e.g., data 73) to one or more users (e.g., user 74) without having to transmit data through a central switching office of the local telephone company (e.g., central office 12) or without having to access an ISP (e.g., ISP 14). In an exemplary embodiment of the present invention, user 72 transmits data 73 via optical network connection 80 to EOAN NOC 76, which routes data 73 via optical network connection 82 to user 74. It should be noted that optical network connections 80-82 preferably provide high-speed Ethernet connections (i.e., Fast Ethernet, Gigabit Ethernet, 10 Gigabit Ethernet, etc.) and attach to the LANs or other data networks of users 72 and 74. In accordance with the present invention, user 72 may transmit data 73 to user 74 with only two hops across the network of EOAN system 1. In addition, data 73 does not need to be converted or modulated to be transmitted. Moreover, users may communicate bi-directionally (i.e., exchange data, send e-mail, make telephone calls, etc.) with each other. For example, user 74 may transmit data to user 72. For example, user 74 may send data 77 via optical network connection 84 to EOAN NOC 76, which routes data 77 via optical network connection 86 to user 72. Thus, users may also transmit data to each other with two hops across the network.

As further illustrated in FIG. 2, a user (e.g., user 72) may preferably send data via the Internet (e.g., Internet 16) without having to transmit the data through a central switching office (e.g., central office 6). In an exemplary embodiment of the present invention, user 72 transmits data 75 via optical network connection 88 to EOAN NOC 76, which routes data 75 via fiber optic cable 90 to ISP 14, which in turn sends data 75 via NAP connection 92 to Internet 16. The present invention requires only three hops across the network of EOAN system 1 for data 75 from user 72 to reach Internet 16. Moreover, in accordance with the present invention, for a user to access the Internet, data (such as data 75) does not need to be modulated prior to transmission because it is being transmitted via an Ethernet protocol. In accordance with the present invention, users may communicate bi-directionally with each other.

In accordance with the present invention as illustrated in FIG. 2, a user (e.g., user 72) may also place a phone call via a NOC (e.g., EOAN NOC 76) through a central switching office (e.g., central office 12). In an exemplary embodiment of the present invention, user 72 may transmit voice data via optical network connection 94 to EOAN NOC 76, which may convert the voice data to telecommunication protocols via an IP-enabled PBX and transmit the voice signal via (preferably) optical network connection 96 to central office 12 via a suitable telecommunications protocol, which then routes the voice signal via optical network connection 98 to PSTN 50. In an alternate embodiment of the present invention, user 72 may transmit voice data using a suitable telecommunication protocol directly to central office 12 via EOAN NOC 76.

Figure 3A:
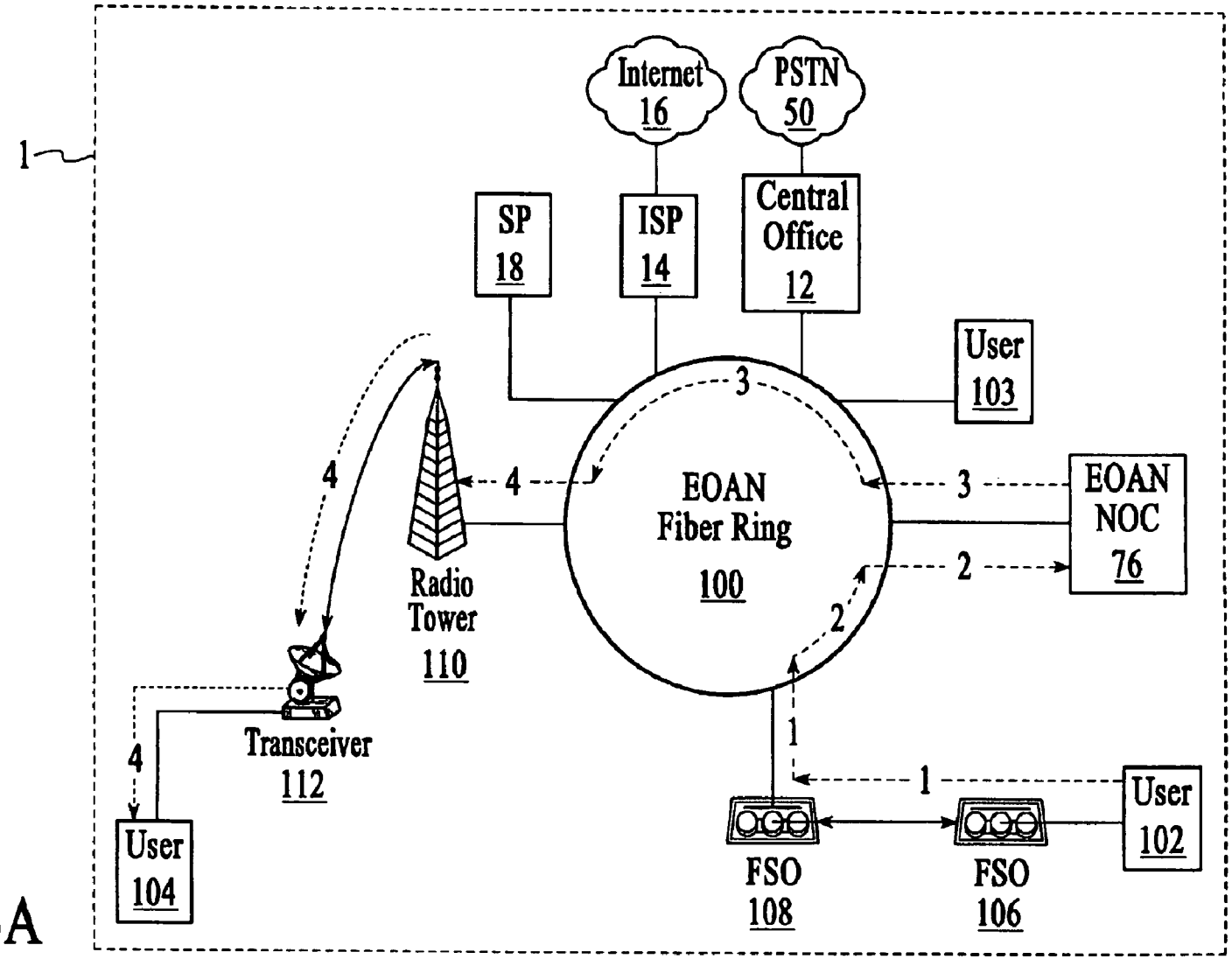
FIG. 3A is a diagram illustrating an EOAN network in accordance with a preferred embodiment of the present invention.

FIG. 3A is a diagram illustrating an exemplary embodiment of EOAN system 1. In accordance with the present invention, EOAN fiber ring 100 is a component of an Ethernet-based network and consists of a fiber optic ring, comprised of groupings of optical fibers (e.g., 144 optical fibers, etc.). Preferably EOAN fiber ring 100 connects a plurality of users, facilities, and/or devices, and is a self-healing fiber optic ring utilizing one or more pairs of fibers, wherein data is sent in both directions simultaneously around the ring to provide redundancy in case a connection is severed. For example, EOAN fiber ring 100 may be a continuous fiber optic ring physically analogous to a Synchronous Optical Network (SONET) ring.

In accordance with the present invention, central office 12, EOAN NOC 76, and a plurality of data transmission equipment, such as radio towers (e.g., radio tower 110) and Free Space Optic (FSO) devices (e.g., FSO 108), are coupled to EOAN fiber ring 100. While not expressly shown or central to the present invention, connections to EOAN fiber ring 100 preferably are made by what are typically known as fiber optic laterals to suitable optical multiplexers or switches. In a typical arrangement, a physical break in the transmit/receiver fiber pair may be made with lateral fibers optically coupled to and extending from the broken fibers to the optical multiplexer/switch, which selectively (such as by wavelength) may receive or transmit or forward optical data along the fiber ring (the use of such a multiplexer or switch, particularly optical switches, is discussed later in connection with FIGS. 4 and 5). What is important is that suitable fiber optic connections be made to EOAN fiber ring 100 in order for the EOAN-type of network as described herein to be implemented and operated as described herein.

Preferably EOAN NOC 76, which is a NOC that provides data switching and management functions, is linked to ISP 14, which provides utilities and services to a plurality of users and is coupled to one or more NAPs on a digital backbone of the Internet. (It should be noted that in accordance with the present invention, an additional redundant NOC may be coupled to EOAN fiber ring 100 in order to provide redundancy; the additional redundant NOC preferably provides equivalent functionality in the event that EOAN NOC 76 fails or is otherwise unable to provide the routing, management and control functions as described herein.) ISP 14, in turn, is coupled to Internet 16. Central office 12 is a central switching office of a local telephone company. Preferably FSO 106-108 are either Point-to-Point (P2P) or Point-to-Multipoint (P2M) laser devices that support Ethernet signaling natively and provide a continuous optical connection. Radio tower 110 and transceiver 112 transmit/receive microwave frequencies to and from users, transceivers, and/or other radio towers via P2P or P2M delivery method. Service provider 18 preferably is a company that provides data and/or services to a plurality of users (such as users 102-104, etc.) and is connected to EOAN fiber ring 100 preferably via a fiber optic lateral. In addition, user 102 preferably is a single location business located within the greater metropolitan area and connected to EOAN fiber ring 100 via FSO 106; user 104 is preferably a remote user located within a certain distance (wherein the certain distance falls within the current limits of microwave technology, i.e., within 35 miles, etc.) from the greater metropolitan area and is connected to EOAN fiber ring 100 via microwave transceiver (such as transceiver 112). User 103 preferably is a single location business connected to EOAN fiber ring 100 via a fiber optic lateral.

In an alternate preferred embodiment of the present invention, ISP 14 may be coupled directly to EOAN NOC 76, wherein, for example, the equipment in EOAN NOC 76 and ISP 14 may be co-located in the same facility.

It is important to note that while the protocol used to transmit/receive data throughout EOAN system 1 is primarily an Ethernet protocol, other protocols may be used in particular circumstances in accordance with the present invention. For instance, telecommunications protocols may be used to transmit voice data to central office 12 when required by a user. For example, such voice data may be transmitted to/from central office 12 in accordance with a suitable telecommunications protocol (such as an OC-3 protocol) via the same fiber optic ring. In one preferred embodiment, EOAN NOC 76 provides voice data to/from central office 12 using a separate wavelength of the WDM wavelengths utilized to transmit data over EOAN fiber ring 100. With such an embodiment, one wavelength may in effect be dedicated for communications with central office 12 utilizing a suitable telecommunications protocol, while all other data transmissions within the EOAN preferably use an Ethernet-based protocol. It also should be noted that the physical transmission media may change depending on particular circumstances.

In accordance with the present invention, in order for one or more users in a metropolitan area to send data to one or more users in a remote location, the user in a metropolitan area (such as user 102) may transmit data via EOAN system 1 to one or more users in a remote location (such as user 104) via a plurality of data transmission technologies using an Ethernet protocol. In an exemplary embodiment of the present invention, user 102 is coupled to FSO 106, which, as will be understood by one skilled in the art, may be implemented so as to not require protocol conversion and may be implemented within a certain radius (wherein the certain radius falls within the current limits of FSO transmission technology, i.e., within 2-kilometer radius, etc.). User 102 preferably transmits data via an Ethernet protocol via an optical network connection (such as fiber optic cable, etc.) or LAN cable to FSO 106, which sends optical signals to FSO 108, which is coupled to EOAN fiber ring 100 (see e.g., FIG. 5). FSO 108 preferably receives the data and transmits them across EOAN fiber ring 100 to EOAN NOC 76, which routes the optical signals to radio tower 110, where the optical signals are converted to microwave signals and sent to transceiver 112, which converts the microwave signals to electrical signals and sends the data preferably via standard LAN cable to user 104. In accordance with the present invention, users may communicate bi-directionally with each other, and preferably using an Ethernet-based protocol as described herein.

As will be understood by one skilled in the art, microwave transmission devices can support Ethernet protocols natively, can exceed 2.4 Gbps, and can have an extensive transmission range of up to 35 miles radius. Thus, unlike conventional MAN technologies, user 102 preferably can transmit data to user 104 via EOAN system 1 in approximately four hops (as illustrated by the dashed lines) while effectively maintaining a local Ethernet connection.

As further illustrated in FIG. 3A, users (such as user 102) may also access the Internet (such as Internet 16) via EOAN system 1. In an exemplary embodiment, user 102 transmits data via Ethernet protocol via optical fiber or LAN cable to FSO 106, which converts electrical signals to optical signals and sends the data to FSO 108, which is coupled to EOAN fiber ring 100. FSO 108 transmits the optical signals via EOAN fiber ring 100 to EOAN NOC 76, which routes the data to ISP 14 and onto Internet 16. Such data transmissions do not require the loss of the Ethernet connection.

In accordance with the present invention, one or more users (such as user 102, etc.) may also connect telephone calls via EOAN fiber ring 100 with EOAN system 1. In an exemplary embodiment, user 102 transmits voice data using an Ethernet protocol via optical fiber or LAN cable to FSO 106, which converts electrical signals to optical signals and sends the voice data to FSO 108, which is coupled to EOAN fiber ring 100. FSO 108 receives the optical signals and transmits them across EOAN fiber ring 100 to EOAN NOC 76, which converts the Ethernet protocols into telecommunication protocols preferably with an IP-enabled PBX and routes the voice data preferably via EOAN fiber ring 100 (such as using a suitable telecommunications protocol and preferably using a dedicated wavelength or channel, as previously described) to central office 12, which is coupled to PSTN 50 and connects the telephone call (as will be appreciated by those of skill in the art, return signals/data transmissions complete the telephone call). Alternatively, voice data may be coupled between EOAN NOC 76 and central office 12 using a separate connection (e.g., UTP cable, fiber optic cable, etc.), and not utilizing EOAN fiber ring 100 as the transport medium for such connection.

In accordance with an alternate embodiment of the present invention, user 102 may transmit voice data using telecommunication protocols via optical fiber or LAN cable to FSO 106, which converts electrical signals to optical signals and transmits the voice data to FSO 108, which is connected to EOAN fiber ring 100. FSO 108 transmits the data across EOAN fiber ring 100 to EOAN NOC 76, which routes the voice data using telecommunication protocols to central office 12 (such as previously described), which is coupled to PSTN 50 and connects the telephone call.

Figure 3B:
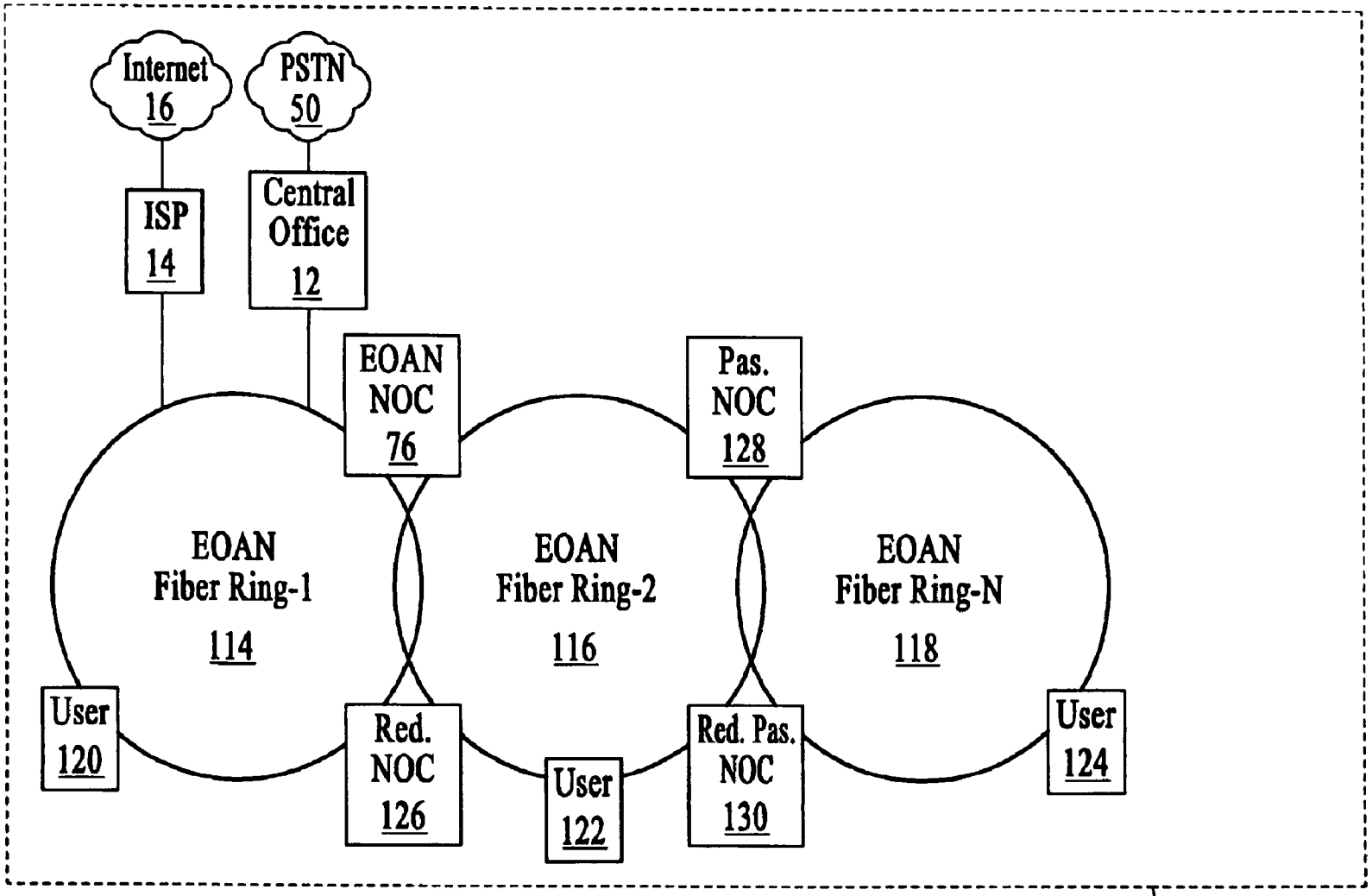
FIG. 3B is a diagram illustrating an EOAN network with a plurality of fiber optic rings in accordance with another preferred embodiment of the present invention.

FIG. 3B is a diagram illustrating an exemplary embodiment of a plurality of fiber rings connected via EOAN system 1. In accordance with the present invention, EOAN fiber ring-1 114, EOAN fiber ring-2 116 and EOAN fiber ring-N 118 are fiber optic rings that connect a plurality of users, facilities, and/or devices and have properties consistent with EOAN fiber ring 100, such as described in conjunction with FIG. 3A. In accordance with the present invention, central office 12, ISP 14, EOAN NOC 76, redundant NOC 126, and a plurality of users, such as user 120, are coupled to EOAN fiber ring-1 114; EOAN NOC 76, redundant NOC 126, passive NOC 128, passive redundant NOC 130, and a plurality of users, such as user 122, are coupled to EOAN fiber ring-2 116; and passive NOC 128, passive redundant NOC 130, and a plurality of users, such as users 124, are coupled to EOAN fiber ring-N 118. Preferably EOAN NOC 76 provides data switching and management functions and is coupled to both EOAN fiber ring-1 114 and EOAN fiber ring-2 116. ISP 14, which is connected to EOAN fiber ring-1 114 and Internet 16, provides utilities and services to a plurality of users and is coupled to one or more NAPs on a digital backbone of the Internet. Central office 12 is a central switching office of a local telephone company coupled to EOAN fiber ring-1 114. Redundant NOC 126 preferably is a NOC that provides equivalent data switching and management capabilities as EOAN NOC 76 and serves as a redundant NOC for EOAN NOC 76. Preferably user 120 is connected to EOAN fiber ring-1 114 via optical network connection (e.g., fiber optic cable, etc.), while user 122 is connected to EOAN fiber ring-2 116 via optical network connection (e.g., fiber optic cable, fiber optic lateral and optical multiplexer or switch, etc.). It is important to note that EOAN fiber ring-1 114 and EOAN fiber ring-2 116 are coupled together via both EOAN NOC 76 and redundant NOC 126. Thus, in accordance with the present invention, one or more fiber rings may be coupled together using one or more NOCs.

As further illustrated in FIG. 3B, in an alternate preferred embodiment of the present invention, a passive NOC (such as passive NOC 128), which serves as a two-way repeater, may be implemented at a node connecting one or more fiber rings (such as EOAN fiber ring-2 116 and EOAN fiber ring-N 118). Redundant passive NOC 130 may also be coupled to EOAN fiber ring-2 116 and EOAN fiber ring-N 118 in order to provide redundancy; redundant passive NOC 130 preferably provides equivalent functionality to passive NOC 128.

It is important to note that a plurality of fiber rings may be connected to one NOC, but additional NOCs (such as redundant NOCs, redundant passive NOCs, etc.) are recommended for redundancy purposes. For example, EOAN fiber ring- 1 114 and EOAN fiber ring-2 116 may be connected by EOAN NOC 76 without redundant or passive NOCs. In accordance with the present invention, EOAN system 1 may connect a plurality of fiber rings via a plurality of NOCs, but only one NOC is required as long as reliable high-speed data communication can be maintained consistent with the data switching and other capabilities of the one NOC, etc.

In accordance with the present invention, one or more users (such as users 120-122) in a metropolitan area may send data to each other via separate but connected fiber rings (such as EOAN fiber ring-1 114 and EOAN fiber ring-N 116, etc.). For example, user 120 may transmit data via Ethernet protocol via EOAN fiber ring-1 114 to EOAN NOC 76, which routes the data via EOAN fiber ring-2 116 to user 122. In accordance with the present invention, users may communicate bi-directionally with each other across separate connected fiber rings.

Figure 3C:
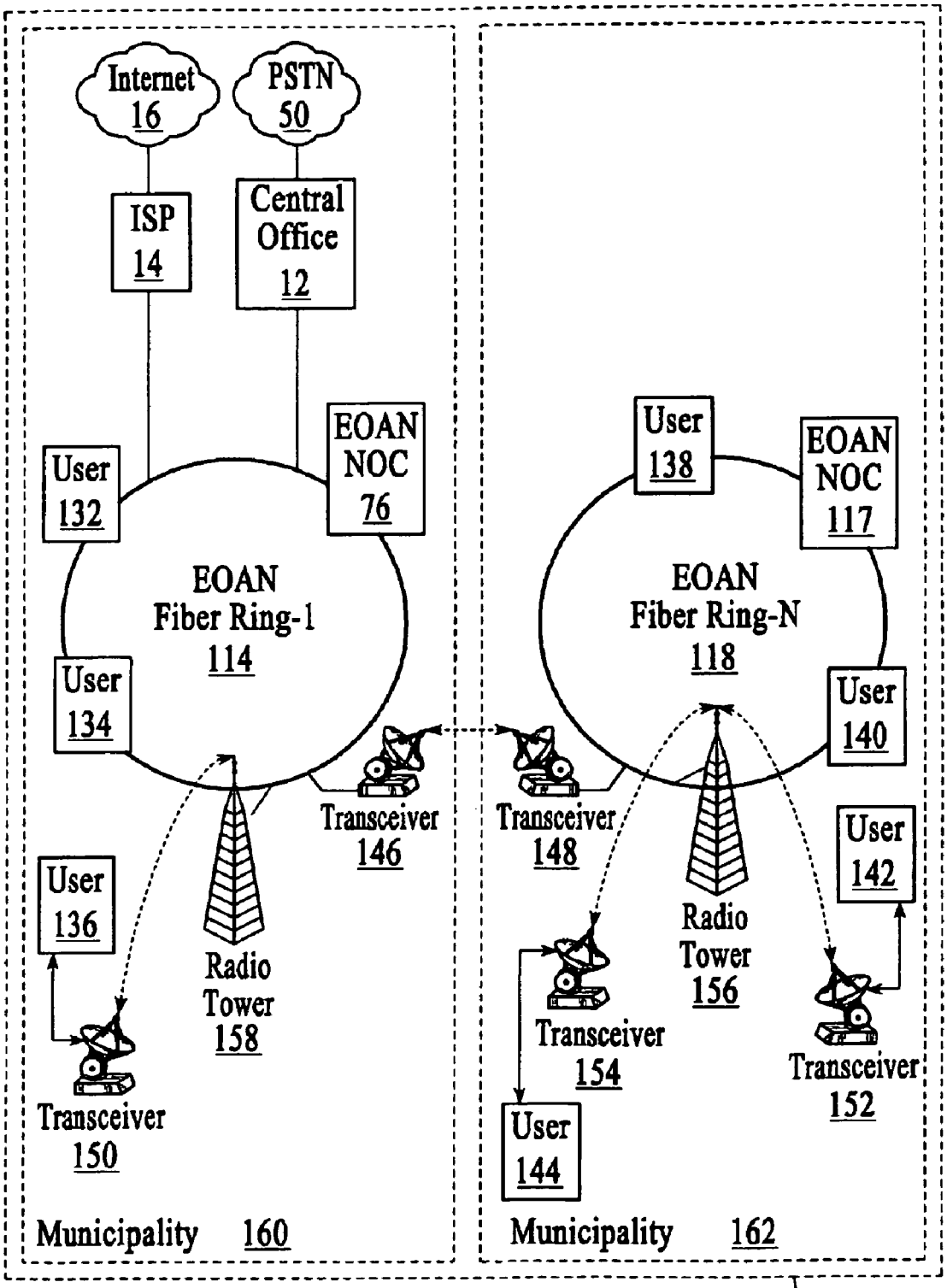
FIG. 3C is a diagram illustrating an EOAN network serving a plurality of municipalities in accordance with another preferred embodiment of the present invention.

FIG. 3C is a diagram illustrating an exemplary embodiment of a plurality of municipalities connected via EOAN system 1. In accordance with the present invention, one or more municipalities, such as Dayton, Ohio and Springfield, Ohio, may be connected via EOAN system 1. Preferably, EOAN fiber ring-1 114 and EOAN fiber ring-N 118 are fiber optic rings that connect a plurality of users, facilities, and/or devices and have properties consistent with EOAN fiber ring 100, such as described in conjunction with FIG. 3A. In this exemplary embodiment, EOAN fiber ring-1 114 is preferably connected to EOAN fiber ring-N 118 via microwave transceivers (such as transceivers 146-148). Preferably EOAN NOC 76 is a NOC that provides data switching and management functions and is coupled to EOAN fiber ring-1 114. ISP 14 connected to EOAN fiber ring-1 114 provides utilities and services to a plurality of users and is coupled to Internet 16. Central office 12 is a central switching office of a local telephone company coupled to EOAN fiber ring-1 114. EOAN NOC 117 preferably provides equivalent data switching and management capabilities as EOAN NOC 76. Radio towers 156-158 preferably transmit/receive microwave frequencies to and from users, microwave transceivers, and/or other radio towers. Preferably, a plurality of users (such as users 132-136) are connected to EOAN fiber ring-1 114 and a plurality of users (such as users 138-144) are connected to EOAN fiber ring-N 118. For example, user 132 and user 138 may be single location businesses, while user 134 and user 140 may be main offices for multi-office businesses. Preferably, user 136 is located within the greater metropolitan area of municipality 160 and connected to EOAN fiber ring-1 114 via microwave technology in this example. Likewise, users 142-144 are located within the greater metropolitan area of municipality 162 and connected to EOAN fiber ring-118 N via microwave technology in this example. User 136 may be a remote office affiliated with user 140, while users 142-144 may be remote offices affiliated with user 134. It should be noted that remote offices may include branch offices, home offices, etc., that may be located in a single-tenant building or a multi-tenant building. Transceivers 146-154 and radio towers 156-158 transmit/receive microwave frequencies to and from users, microwave transceivers, and/or other radio towers via a P2P or P2M delivery method. (In an alternate preferred embodiment, transceiver 148 may be directly coupled to radio tower 156.)

As illustrated in FIG. 3C, in accordance with the present invention, users may share data communications with other users in the same municipality. For instance, a user (such as user 132) may send data to one or more users (such as users 134-136). User 132, which is connected to EOAN NOC 76 via an optical network connection (e.g., fiber optic cable, fiber optic lateral and optical multiplexer or switch, etc.), transmits data via an Ethernet protocol across EOAN fiber ring-1 114 to EOAN NOC 76, which routes the data to user 134. In addition, user 132 may send the same data to user 136; in this example user 132 sends data via an Ethernet protocol across EOAN fiber ring-1 114 to EOAN NOC 76, which routes the data to radio tower 158, where the optical signals are converted to microwave signals and transmitted to transceiver 150. Transceiver 150 converts the microwave signals to electrical signals and sends the data to user 136. Accordingly, users may communicate bi-directionally with each other on the same fiber ring.

In accordance with the present invention, users in one municipality (such as municipality 160) may also share the same data communications with users in another municipality (such as municipality 162). Microwave technology may be used to connect municipalities on separate fiber rings located within a certain distance of each other (wherein the certain distance falls within the current limits of microwave technology, for example, within 35 miles, etc.). For instance, a user in one municipality (such as user 132) may send data to one or more users in a different municipality (such as users 138-140). User 132, which preferably is connected to EOAN NOC 76 via an optical network connection (e.g., fiber optic cable, fiber optic lateral and optical multiplexer or switch, etc.), transmits data via an Ethernet protocol across EOAN fiber ring-1 114 to EOAN NOC 76, which routes the data via an Ethernet protocol to transceiver 146. Transceiver 146 converts optical signals to microwave signals and transmits the microwave signals to transceiver 148. Upon receipt of the microwave signals, transceiver 148 converts the microwave signals back to optical signals and sends the data to EOAN NOC 117, which routes the data via an Ethernet protocol to users 138-140. In accordance with the present invention, users may communicate bi-directionally with each other across the separate fiber optic rings.

As further illustrated in FIG. 3C, one or more users in one municipality, such as user 134, may send data to one or more users in remote office locations in another municipality, such as user 142-144. For example, user 134 transmits data via an Ethernet protocol across EOAN fiber ring-1 114 to EOAN NOC 76, which switches the data to transceiver 146, which converts optical signals to microwave signals and transmits them to transceiver 148. Transceiver 148 receives the microwave signals and converts them back to optical signals and sends the data via an Ethernet protocol to EOAN NOC 117, which routes the data to radio tower 156, where optical signals are converted to microwave signals and transmitted to transceivers 152-154. Transceivers 152-154 convert the microwave signals to electrical signals and send the data via an Ethernet protocol to users 142-144, respectively. Accordingly, users may communicate bi-directionally with each other across separate fiber rings.

It is important to note that transceivers 146-154 and radio towers 156-158 may use a P2P or P2M delivery methods. For example, radio tower 158 may transmit microwave signals to a single transceiver (e.g., transceiver 150), a single radio tower (e.g., radio tower 156), or a plurality of transceivers and/or radio towers (e.g., transceivers 146-154, radio tower 156, etc.).

In accordance with the present invention, one or more users in one municipality, such as user 140, etc., may also place a telephone call through central office 12 in another municipality. For example, user 140 transmits voice data (using Voice Over IP, for example) via optical signals across EOAN fiber ring-N 118 to EOAN NOC 117. EOAN NOC 117 routes the voice data to transceiver 148, which converts optical signals to microwave signals and transmits them to transceiver 146. Transceiver 146 preferably receives the microwave signals and converts them back to optical signals and sends the voice data to EOAN NOC 76, which converts the data into telecommunication protocols with a PBX switch and routes the voice data via optical signals across EOAN fiber ring-1 114 to central office 12, which connects the telephone call via PSTN 50.

In alternate preferred embodiments of the present invention, one or more users in one municipality, such as user 140, etc., may also place a telephone call via standard telecommunication protocols through central office 12 in another municipality. For instance, user 134 transmits voice data via standard telecommunication protocols via optical signals across EOAN fiber ring-N 118 to EOAN NOC 117, which routes the voice data to transceiver 148, which converts optical signals to microwave signals and transmits them to transceiver 146. Transceiver 146 receives the microwave signals and converts them back to optical signals and sends the voice data to EOAN NOC 76, which routes the voice data via telecommunications protocols via optical signals across EOAN fiber ring-1 114 to central office 12, which connects the telephone call via PSTN 50. In such embodiments, as described earlier herein, dedicated channels or wavelengths may be dedicated to such telecommunication protocol communications with central office 12, which may serve to facilitate the convenient implementation of voice-telephony services over the EOAN.

It should be noted that in an alternate embodiment of the present invention, an additional radio tower may be provided to extend the range of microwave transmissions. For instance, users 142-144 may be connected to EOAN fiber ring-N 118 via an additional radio tower, which may act as a repeater and transmit microwave signals between radio tower 156 and transceivers 152-154. Thus, user 138 may send data to user 142 by transmitting data via an Ethernet protocol via EOAN fiber ring-N 118 to EOAN NOC 117, which routes optical signals to radio tower 156, where the optical signals are converted to microwave signals and transmitted to an additional radio tower, which may process and/or amplify the microwave signals and send them to transceivers 152-154. Transceivers 152-154 then convert the microwave signals to electrical signals and sends the data via an Ethernet protocol to users 142-144, respectively. In accordance with the present invention, the range of microwave transmissions between users may be extended via one or more radio towers functioning as repeaters.

Figure 3D:
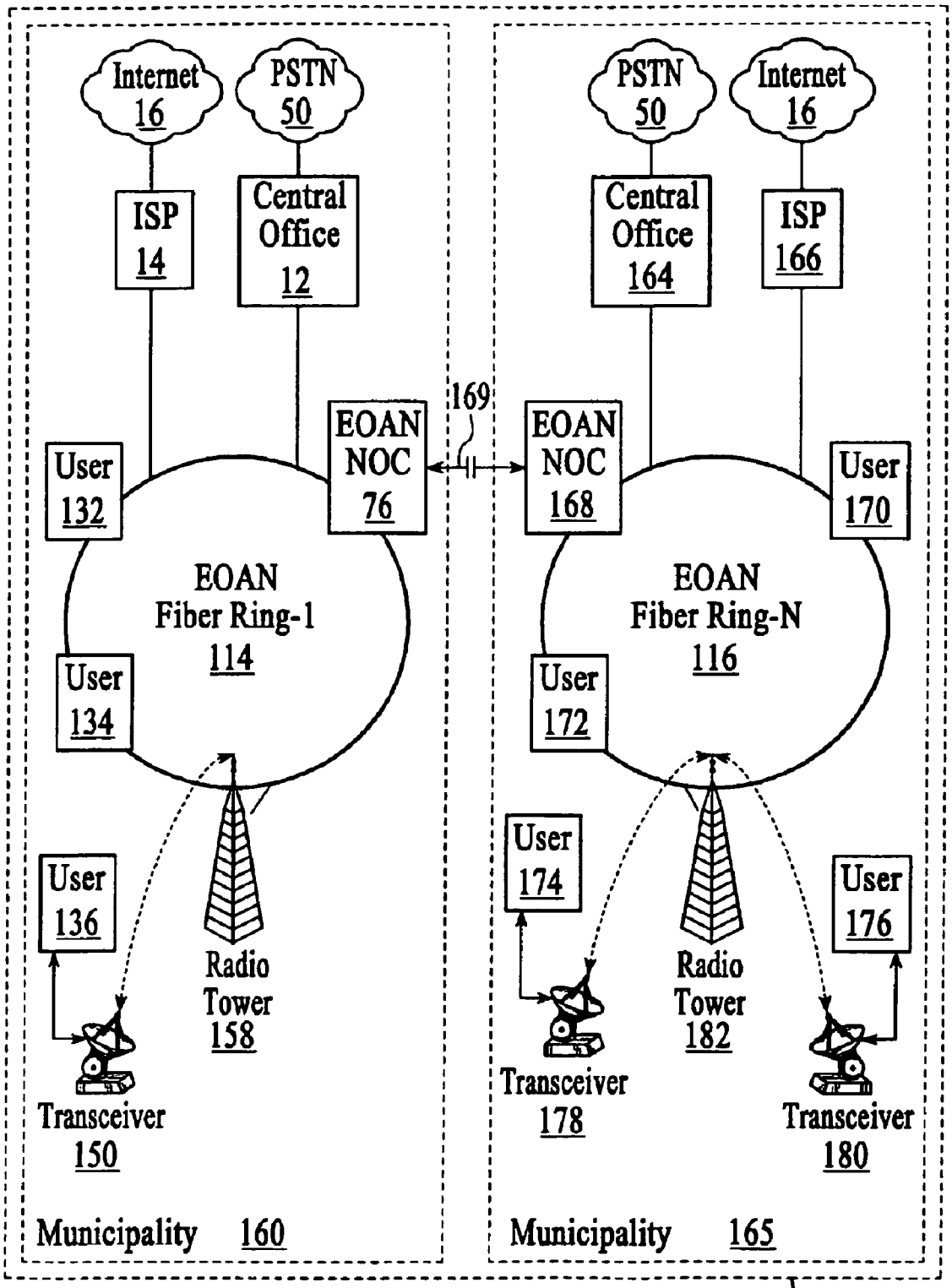
FIG. 3D is a diagram illustrating an alternate embodiment of an EOAN network serving a plurality of municipalities in accordance with another preferred embodiment of the present invention.

FIG. 3D is a diagram illustrating another exemplary embodiment of one or more municipalities connected via EOAN system 1. In accordance with the present invention, one or more municipalities, such as Dayton, Ohio and Cincinnati, Ohio, may be connected via EOAN system 1. Preferably EOAN fiber ring-1 114 and EOAN fiber ring-N 116 are fiber optic rings that connect a plurality of users, facilities, and/or devices and have properties consistent with EOAN fiber ring 100, such as described in conjunction with FIG. 3A. It should be noted that EOAN fiber ring-1 114 and EOAN fiber ring-N 116 are separate fiber optic rings and have separate connections to central offices (such as central office 12 and central office 164). Central office 12 is coupled to PSTN 50 and ISP 14 and central office 164 is connected to PSTN 50 and ISP 166. ISP 14 and ISP 166 are connected to Internet 16. EOAN fiber ring-1 114 is preferably connected to EOAN fiber ring-N 116 via a long haul fiber connection (such as long haul fiber 169, which, for example, may consist of leased and/or purchased fiber optic cable and which may have repeaters in order to implement the long haul fiber connection).

As illustrated in FIG. 3D, long haul fiber 169 preferably provides the only network connection between EOAN fiber ring-1 114 and EOAN fiber ring-N 116. Users may communicate bi-directionally with each other across the separate fiber rings. Preferably EOAN NOC 76 and EOAN NOC 168 are NOCs that provide data switching and management functions such as previously described, and are coupled to EOAN fiber ring-1 114 and EOAN fiber ring-N 116, respectively. ISPs 14 and 166 provide utilities and services to a plurality of users and are coupled to one or more NAPs. ISP 14 is connected to EOAN fiber ring-1 114 and Internet 16. ISP 166 is connected to EOAN fiber ring-N 116 and Internet 16. Central offices 12 and 164 are central switching offices of local telephone companies coupled to EOAN fiber ring-1 114 and EOAN fiber ring-N 116, respectively. Radio towers 158 and 182 preferably transmit microwaves frequencies to and from users, microwave transceivers, and/or other radio towers. Preferably a plurality of users (such as users 132-136, etc.) are connected to EOAN fiber ring-1 114 and a plurality of users (such as users 170-178, etc.) are connected to EOAN fiber ring-N 116.

In accordance with the present invention, one or more users in one municipality, such as users 132-136, etc., may also share the same data communications with one or more users in another municipality, such as users 170-176, etc., via EOAN system 1. A long haul optical network connection, such as long haul fiber 169, may be used to connect municipalities on separate fiber rings located within a certain distance of each other (wherein the certain distance exceeds the current limits of microwave technology, for example, about 60 miles or greater, etc.). For instance, user 132 in municipality 160 may send data to users 170-172 in municipality 165. Accordingly, user 132 transmits data via an Ethernet protocol across EOAN fiber ring-1 114 to EOAN NOC 76, which routes the data via optical signals via long haul fiber 117 to EOAN NOC 168. EOAN NOC 168 transmits the data via optical signals to users 170-172. In accordance with the present invention, users may communicate bi-directionally with each other across separate fiber optic rings via a long haul fiber connection using an Ethernet protocol.

Figure 3E:
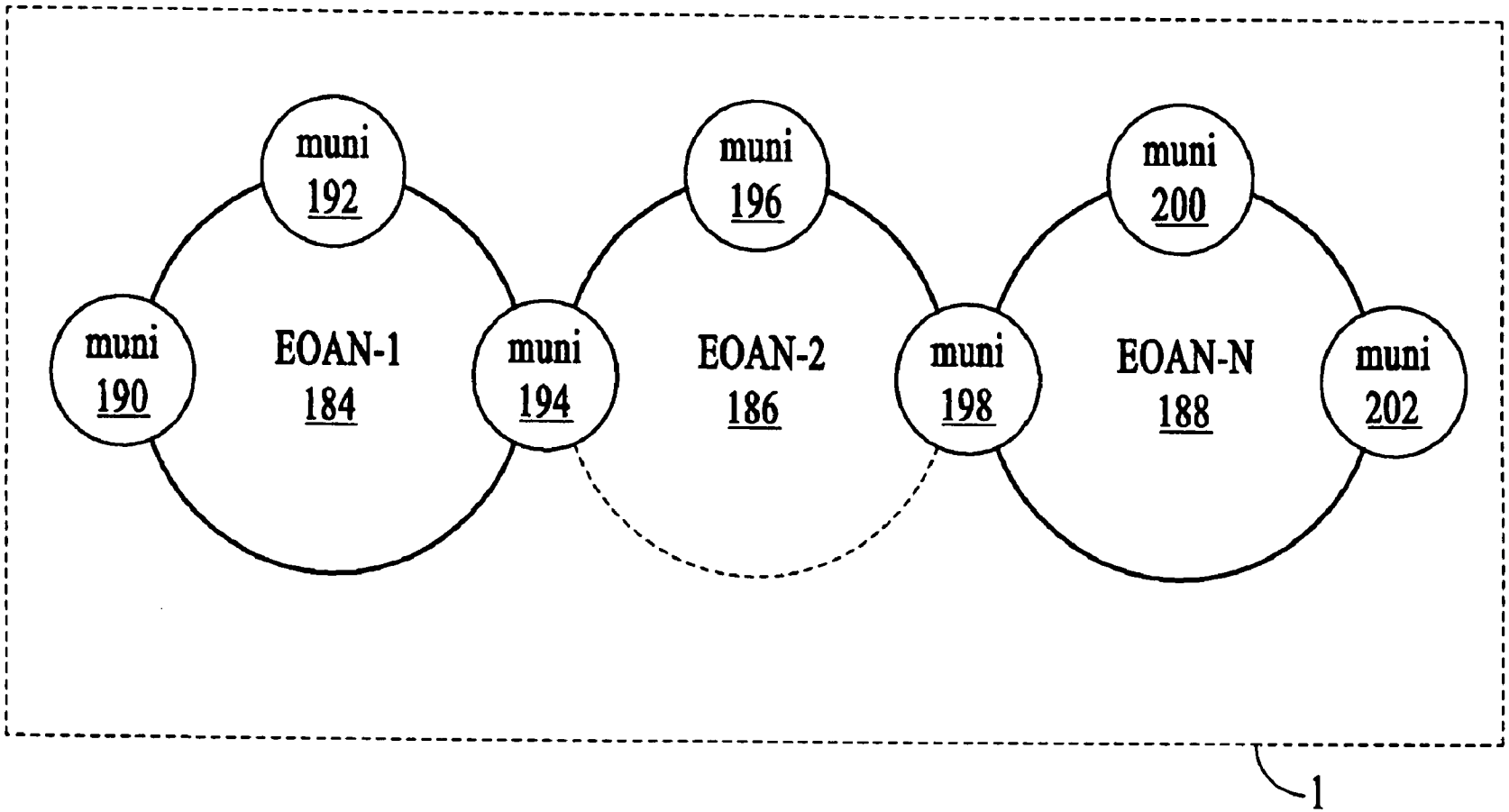
FIG. 3E is a diagram illustrating an EOAN network serving a plurality of metropolitan areas in accordance with another preferred embodiment of the present invention.

FIG. 3E is a diagram illustrating another exemplary embodiment of a plurality of metropolitan areas connected via EOAN system 1. In accordance with the present invention, a plurality of municipalities, such as New York, N.Y. and Philadelphia, Pa. and Washington, D.C., etc., may be connected via a plurality of EOAN networks (a municipality providing a plurality of users, facilities, and/or devices to be connected to the fiber optic ring, such as previously described). For instance, municipalities (such as municipalities 190-202, etc.) are connected via large fiber rings to EOAN networks (such as EOAN-1 184, EOAN-2 186, EOAN-N 188, etc.). EOAN networks are components of EOAN system 1, such as previously described in connection with FIG. 3A-3D. Preferably EOAN networks connect a plurality of municipalities (such as described in FIGS. 3C and 3D), so a plurality of users may share data communication across multiple municipalities and regions. In such embodiments, municipalities 190-194 are connected to EOAN-1 184, municipalities 194-198 are connected to EOAN-2 186, and municipalities 198-202 are connected to EOAN-N 188, wherein municipality 194 and municipality 198 are coupled to a plurality of EOAN networks (e.g., EOAN-1 184, EOAN-2 186, EOAN-N 188, etc.) and thus serve as nodes to more than one network. In accordance with the present invention, municipalities on fiber rings may be connected to each other via a plurality of types of transmission media (such as FSO, optical signals, microwave signals, infrared light, etc.) and physical pathways (such as UTP, fiber optic cable, long haul fiber, OC-3, OC-12, etc.).

As illustrated in FIG. 3E, a plurality of municipalities may be connected together as part of EOAN system 1. In accordance with the present invention, a plurality of municipalities (such as municipalities 190-194) on one EOAN network (such as EOAN-1 184) may be connected to a plurality of municipalities (such as municipalities 194-198) on another separate EOAN network (such as EOAN-2 186). Preferably municipalities on separate EOAN networks may share data communications with each other as long as one or more municipalities serve as nodes to more than one EOAN network in EOAN system 1. For example, municipality 194 serves as a node for both EOAN-1 184 and EOAN-2 186, and municipality 198 serves as a node for both EOAN-2 186 and EOAN-N 188. Thus, a plurality of users in municipality 190 may communicate bi-directionally with a plurality of users in municipality 202. Accordingly, one or more users in municipality 190 send data via EOAN-1 184 to EOAN NOC in municipality 194, which routes data via EOAN-2 186 to EOAN NOC in municipality 196, which in turn routes data via EOAN-2 186 to EOAN NOC in municipality 198, which sends data via EOAN-N 188 to EOAN NOC in municipality 202, which routes data to one or more users in municipality 202. In accordance with the present invention, such data communications preferably occur within EOAN system 1 using an Ethernet protocol.

As further illustrated in FIG. 3E, municipalities may remain connected to each other via EOAN system 1 when a single network connection is severed. For instance, a connection (such as optical network connection 204) on EOAN-2 186 may be cut, potentially severing communications between two municipalities (such as municipality 194 and municipality 202). In accordance with the present invention, EOAN system 1 implements a continuous loop network, wherein each node on the network is connected to at least two other nodes in the network. Moreover, EOAN system 1 is connected via a plurality of self-healing fiber optic rings, wherein data are sent in both directions simultaneously across the fiber rings. Thus, if any one connection in an EOAN system 1 is severed, it will not disrupt data communications between nodes on the network. For example, municipality 194 connecting EOAN-1 184 and EOAN-2 186 may still communicate with municipality 298 and other municipalities on EOAN-N 188, such as municipalities 200-202, when optical network connection 204 is severed. As will be understood based on the description herein, this concept of self-healing fiber rings is applicable generally to the fiber rings disclosed herein.

Figure 4:
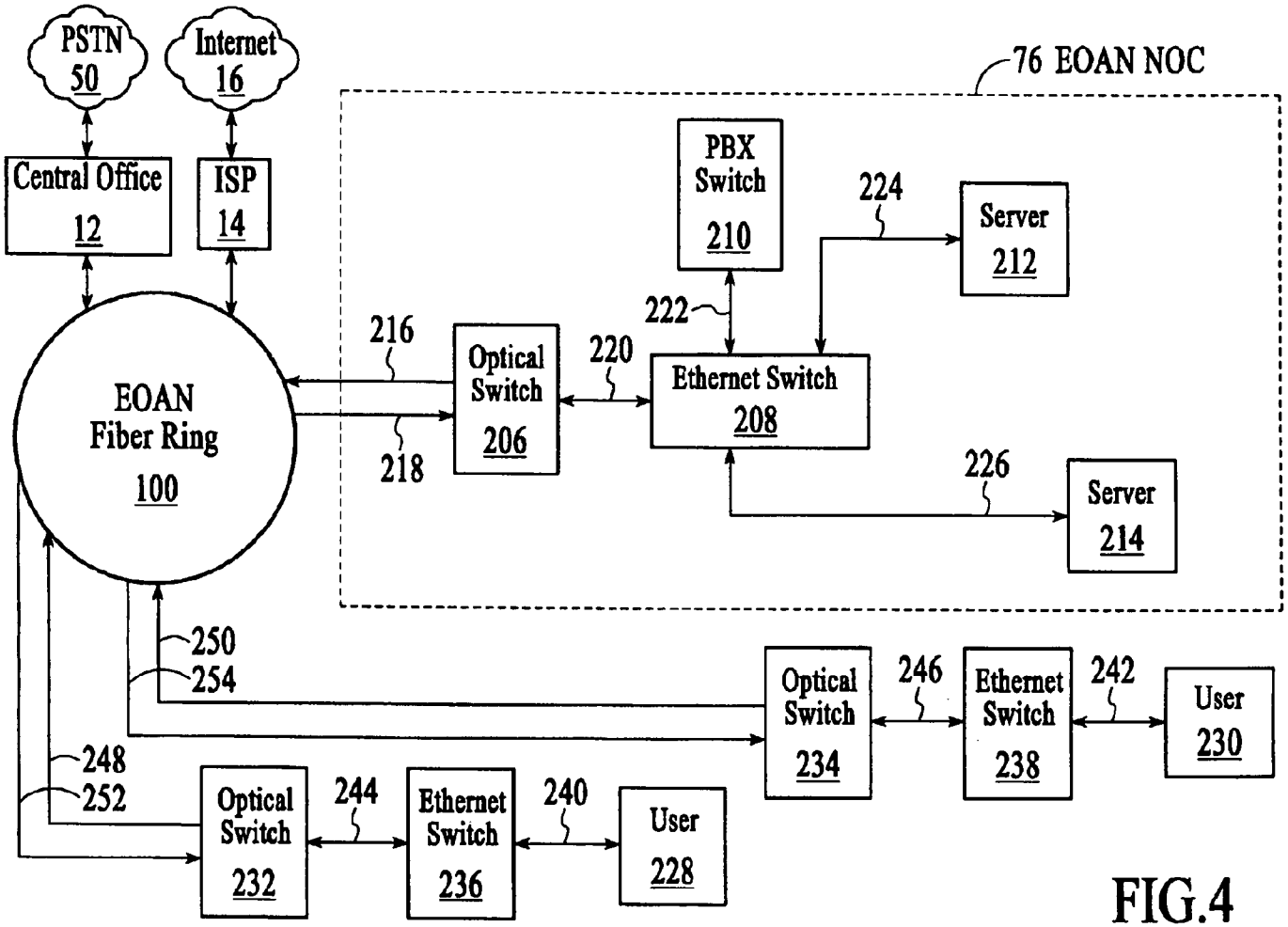
FIG. 4 is a diagram illustrating NOC architecture for an EOAN system in accordance with a preferred embodiment of the present invention.

FIG. 4 is a diagram illustrating an exemplary embodiment of the architecture for a Network Operations Center (NOC) for EOAN system 1. In accordance with the present invention, EOAN NOC 76 provides Ethernet switching and network management functions, which will be described in further detail below. The network architecture for EOAN NOC 76 preferably includes one or more optical switches or multiplexers (such as optical switch 206), one or more Ethernet switches (such as Ethernet switch 208), one or more PBX switches (such as PBX switch 210), and one or more servers (such as servers 212-214). Optical switch 206 preferably is a Wave Division Multiplexing (WDM) or Dense Wave Division Multiplexing (DWDM) optical switch (such as Ciena Multiwave Metro, Ciena MultiWave MetroDirector K2, LuxN WavSystem 3234, etc.), which can support a plurality of protocols (Ethernet, SONET, ATM, etc.) and interface rates (OC-3, OC-12, OC-48, OC-192, etc.) on each optical fiber. Optical switch 206, which will be described in greater detail below, provides a means of expanding the capabilities of fiber optic transmissions by multiplexing wavelengths of light into multiple channels. It should be noted that optical switches, as used herein, primarily are used as bridging multiplexers to bolster bandwidth and performance of EOAN system 1 by providing WDM or DWDM capabilities. Accordingly, the management capabilities of the optical switches, which are typically provided by optical switch management applications (such as LuxN OSLM, Ciena OnCenter, etc.), in preferred embodiments are generally limited to functions, such as monitoring data traffic, etc. Ethernet switch 208 preferably is an intelligent Ethernet switch (such as Extreme Networks BlackDiamond 6808, Extreme Networks BlackDiamond 6816, etc.), which is a Layer 2 switch that is Layer 3 aware, and is designed with carrier-class fault tolerance for data networks requiring scalability from 100 Mbps to 10 Gbps. PBX switch 210 preferably is a VoIP-enabled PBX switch (such as Nortel Meridian, Lucent Difinity, Inter-Tel Axxess, etc.) designed for routing voice data from users to PSTN 50 via central office 12. It should be noted that the network management application (e.g., Extreme Networks ExtremeWare, HP OpenView, etc.) provided in EOAN NOC 76 can view an optical switch management application (such as LuxN OSLM, Ciena OnCenter, etc.). In accordance with the present invention, the optical switches preferably are managed via the optical switch management application (such as LuxN OSLM, Ciena OnCenter, etc.), which may be managed on a network basis via the network management application provided in EOAN NOC 76 (thus, the various optical switches are centrally managed via EOAN NOC in accordance with the present invention). Server 212 preferably is a network management server (such as HP NetServer, etc.) that monitors network activity and runs a network management application (such as Extreme Networks ExtremeWare, HP OpenView, etc.) for purposes of providing such central EOAN management. Server 214 preferably is a database server running a database language (such as SQL, etc.) that houses the database for MAN hosting over EOAN system 1. In accordance with the present invention, servers 212-214 may be combined into a single server providing the same functionality as server 212 and server 214 or may be separated into more than two servers providing the same functionality as server 212 and server 214.

In accordance with the present invention, servers 212-214 preferably are coupled to Ethernet switch 208 via LAN cable 224 and LAN cable 226, respectively. Ethernet switch 208 preferably is connected to optical switch 206 via LAN cable 220 and to PBX switch 210 via LAN cable 222. LAN cables 220-226 preferably are standard LAN cables (e.g., CAT5 cable for Ethernet, etc.). Optical switch 206 preferably is connected to EOAN fiber ring 100 via one or more pairs of optical fibers (i.e., comprising a transmitting fiber and a receiving fiber, such as fibers 216-218, etc.) from a fiber grouping (this may be a fiber optical lateral, as previously described). Preferably optical fibers (e.g., fibers 216-218 and 248-254, etc.) are Single Mode (SM) fibers suitable for WDM and DWDM use, such as, for example, fibers in the 1310 nm band or 1550 nm band. Preferably fiber 216 is a transmitting fiber, which transmits data via EOAN fiber ring 100, and fiber 218 is a receiving fiber, which receives data via EOAN fiber ring 100. Fiber ring 100 connects a plurality of users, facilities, and/or devices and has the same properties such as described above in conjunction with FIG. 3A. In accordance with the present invention, servers 212-214, PBX switch 210, Ethernet switch 208 and optical switch 206 may communicate bi-directionally with each other.

As will be understood by one skilled in the art, fiber optic cable uses light pulses to carry data. Preferably, optical switches can multiplex light waves into a plurality of channels (e.g., 40 channels), wherein each channel has a different frequency/wavelength and transmits data within specified GHz intervals. With such WDM or DWDM optical switches, each channel can be split into multiple managed groups, which can carry data aggregating at rates of up to 10 Gbps. Thus, in accordance with the present invention, for example, EOAN NOC 76 can support 960 separate connections per each fiber pair at data rates between 100 Mbps to 2.4 Gbps when implementing a DWDM optical switch, such as LuxN WavSystem 3234, Ciena Multiwave MetroDirector K2, etc.

As illustrated in FIG. 4, EOAN NOC 76 is coupled to EOAN fiber ring 100, which in turn is coupled to central office 12 and ISP 14. Preferably ISP 14 provides utilities and services to a plurality of users, and is coupled to Internet 16 and one or more NAPs on a digital backbone of the Internet. Optical switch 206 in EOAN NOC 76 is connected via fibers 216-218 to EOAN fiber ring 100, which may transmit data at rates in excess of 1.6 Terabits per second per pair of fiber. Preferably central office 12 and a plurality of users (e.g., user 228-230) are coupled to EOAN fiber ring 100 such as previously described: Central office 12 is a central switching office of a local telephone company and is connected to PSTN 50.

In accordance with the present invention, EOAN system 1 provides network management, QoS standards, and network security through EOAN NOC 76. Network management is maintained via server 212 and Ethernet switch 208. As noted above, server 212 (such as HP NetServer, etc.) monitors network activity via a network management application (such as Extreme Networks ExtremeWare, HP OpenView, etc.), which preferably uses a Simple Network Management Protocol (SNMP) type protocol and provides customer data and service management, and other network capabilities (e.g., switch management, status monitoring, port statistics, network audit logs, event databases, software integration, network security, network modeling, etc.). Server 212 manages Ethernet switch 208, which is an intelligent switch that may be managed directly via a terminal at server 212 or remotely via a plurality of remote access methods, such as Telnet, SSH2, SNMP, browser-based, device management software (e.g., Extreme Networks ExtremeWare Vista), etc. Thus, from EOAN NOC 76 it is possible to direct data traffic to specific nodes, control potential collisions, and provide maintenance to all parts of EOAN system 1, including the plurality of optical switches provided in EOAN system 1. It should be noted that Ethernet switches at customer sites, such as Ethernet switches 236-238, etc., are also intelligent switches that may be managed directly via a terminal or remotely via a plurality of remote access methods, such as Telnet, SSH2, SNMP, browser-based, device management software (e.g., Extreme Networks ExtremeWare Vista), etc.

Because the Ethernet switches (such as Ethernet switches 208 and 236-238, etc.) are intelligent switches with policy-based QoS, they can reserve and/or limit bandwidth for specified categories of data (e.g., voice, video, etc.) and/or specified categories of applications (e.g., video applications, database applications, etc.). The Ethernet switches perform these functions by applying priority parameters of the management software application (e.g., Extreme Networks ExtremeWare, etc.). The priority parameters determine how an Ethernet switch (such as Ethernet switch 208, etc.) allocates bandwidth and data traffic for each hardware queue on each physical port. For example, data may be assigned a priority status for Ethernet switch 208, so that one type of data (such as voice data, etc.) may be given precedence over another type of data (such as e-mail, etc.) placed in a hardware queue on a physical port. When a plurality of hardware queues on the same physical port are contending for transmission, Ethernet switch 208 accordingly prioritizes bandwidth use and data traffic according to the priority parameters.

It has been found to be advantageous to the establishment and maintenance of QoS for EOAN system 1 to use a consistent brand or type of equipment and network management applications (e.g., Extreme Networks BlackDiamond 6816, Alpine 3804, ExtremeWare, etc.) for managing all Ethernet switches throughout EOAN system 1. The use of such common-management equipment and application potentially reduces the incompatibilities between different protocols, interfaces, and system requirements by securing consistently terminated end points. While this is recommended, it is not required for the proper function of EOAN system 1.

In accordance with the present invention, EOAN NOC 76 also monitors EOAN fiber ring 100 and each node in EOAN system 1 for network breaks and faults. Thus, if a break in the fiber ring occurs, then EOAN NOC 76 is not only aware of the break, but can also maintain network connectivity throughout. EOAN system 1 until the break is repaired because data is transmitted across the fiber ring simultaneously in both directions. For example, if EOAN NOC 76 is sending data to users 228-230 in EOAN system 1 and a break in EOAN fiber ring 100 occurs, data may continue to be sent to and from users 228-230 because if a break occurs on one side of EOAN fiber ring 100, then the data may reach users 228-230 via the other side of EOAN fiber ring 100. Moreover, EOAN NOC 76 can continue to manage optical switches and Ethernet switches throughout EOAN system 1 as long as data traffic is not entirely cut off from any of the nodes.

It is important to note that in accordance with the present invention EOAN system 1 is a private network. Therefore, network security is maintained because EOAN system 1 does not provide direct access to public networks. Accordingly, all data and data transmissions (including data transmissions being sent to PSTN 50, Internet 16, etc.) are managed by (and pass through) EOAN NOC 76. Thus, data may be transmitted bi-directionally between users 228-230 in a secure environment without modems or routers. Since EOAN system 1 does not provide direct access to public networks and uses a plurality of transmission media, it is exceptionally difficult to break network security. For example, it is difficult to intercept a wireless transmission path (such as FSO transmissions, microwave transmissions, etc.) of EOAN system 1 because such methods require knowing the exact frequency and encryption codes of the transmission (both of which are proprietary). It is also difficult, for example, to tap fiber optic cables of EOAN system 1 without being detected because once the physical pathway is severed the transmission of optical signals is corrupted.

Furthermore, in accordance with the present invention, EOAN system 1 may provide Virtual LAN (VLAN) and Virtual MAN (VMAN) environments for users by tagging all data from all user locations, such as an office, lab, etc., with a unique frame tag. Preferably VLANs are managed with network management protocols via a network management server (e.g., server 212, etc.) of EOAN NOC 76. Moreover, by connecting several VLANs, EOAN system 1 may also provide a VMAN environment, wherein several VLANs may share the same but separate unified network.

As further illustrated in FIG. 4 in accordance with the present invention, users 228-230 are also coupled to EOAN fiber ring 100. Users 228-230 are preferably businesses and may include users, servers, switches, telephones, and/or other devices necessary for voice and data communications in a LAN. User 228 is coupled via LAN cable 240 to Ethernet switch 236, which is coupled via LAN cable 244 to optical switch 232, which is connected via fibers 248 and 252. User 230 is coupled via LAN cable 242 to Ethernet switch 238, which is coupled via LAN cable 246 to optical switch 234, which is connected via fibers 250 and 254 (e.g., a lateral fiber arrangement, such as previously described). Preferably Ethernet switches 236-238 are Ethernet switches (such as Extreme Networks Summit 4, etc.) that provide Ethernet connectivity at a plurality of high-speed rates (such as Fast Ethernet, Gigabit Ethernet, 10 Gigabit Ethernet, etc.). Preferably optical switches 232-234 are either WDM or DWDM optical switches (such as Ciena MultiWave Metro One, etc.) designed for customer premise and short-haul fiber ring applications. Preferably LAN cables 240-246 are standard LAN cables (e.g., CAT5 cable for Ethernet, etc.). Preferably fibers 248-250 and 216 are transmitting fibers, which transmit data via EOAN fiber ring 100. Likewise, fibers 252-254 and 218 are preferably receiving fibers, which receive data via EOAN fiber ring 100.

As further illustrated in FIG. 4, in preferred embodiments a particular user (such as user 228, etc.) may transmit data to one or more users (such as user 230, etc.) via one or more dedicated channels via EOAN system 1 (where, for example, such one or more dedicated channels are assigned to the particular user). For example, user 228 may transmit data via EOAN fiber ring 100 and EOAN NOC 76 to user 230. In accordance with the present invention, user 228 sends data via LAN cable 240 to Ethernet switch 236, which routes data via LAN cable 244 to optical switch 232, which converts electrical signals to optical signals, multiplexes the optical signals, and sends the data to fiber optic ring 100 via a dedicated channel on transmitting fiber 248. Fiber optic ring 100 routes the data via a dedicated channel on receiving fiber 218 to optical switch 206 in EOAN NOC 76. Optical switch 206 de-multiplexes the optical signals, converts the optical signals back to electrical signals, and sends the data via LAN cable 220 to Ethernet switch 208, which in turn routes data via LAN cable 220 back to optical switch 206, which converts electrical signals to optical signals, multiplexes the optical signals, and sends the data via a dedicated channel on transmitting fiber 216 via fiber optic ring 100. Fiber optic ring 100 routes the data via a dedicated channel on receiving fiber 254 to optical switch 234, which de-multiplexes the optical signals, converts the optical signals to electrical signals and transmits the data via LAN cable 246 to Ethernet switch 238, which routes data via LAN cable 242 to user 230. In accordance with the present invention, users may communicate bi-directionally with each other via dedicated channels. Thus, particular users may be assigned one or more particular channels, wherein other users may not be assigned a particular channel (the data for such other users may be segregated such as by VLAN/VMAN-type frame tags and the like).

As further illustrated in FIG. 4, Ethernet switches may be managed from EOAN NOC 76. Preferably a system administrator at EOAN NOC 76 can monitor the status and functions of each Ethernet switch with the network management application (e.g., Extreme Networks ExtremeWare, HP OpenView, etc.) provided in EOAN NOC 76 by viewing logs, running diagnostics, etc. Ethernet switches at the client site (e.g., Ethernet switches 236-238) may be implemented, for example, to send switch information at pre-determined intervals (e.g., every 10 seconds, 20 seconds, etc.) to server 212 in EOAN NOC 76, which maintains data logs on switch and network performance for each node in EOAN system 1. For instance, Ethernet switch 236 routes data (such as switch information, etc.) via LAN cable 244 to optical switch 232, which converts electrical signals to optical signals, multiplexes the optical signals, and sends the data to fiber optic ring 100 via, for example, a dedicated channel on transmitting fiber 248. Fiber optic ring 100 routes the data via a dedicated channel on receiving fiber 218 to optical switch 206, which de-multiplexes the optical signals, converts optical signals back to electrical signals, and sends the data via LAN cable 220 to Ethernet switch 208, which routes data via LAN cable 224 to server 212. Accordingly, server 212 processes the data by running a suitable network management application (e.g., Extreme Networks ExtremeWare, HP OpenView, etc.), which provides users (such as system administrators, etc.) with the capability to monitor switch performance by viewing logs, running diagnostics, etc.

In another example in accordance with the present invention, Ethernet switch 208 in EOAN NOC 76 can manage network traffic and request data directly from Ethernet switch 232. Server 212 may send requests for data via LAN cable 224 to Ethernet switch 208, which routes data via LAN cable 220 to optical switch 206, which converts electrical signals to optical signals, multiplexes the optical signals, and sends the data via, for example, a dedicated channel on transmitting fiber 216 via fiber optic ring 100. Fiber optic ring 100 routes the data via a dedicated channel on receiving fiber 252 to optical switch 232, which de-multiplexes the optical signals, converts optical signals to electrical signals and transmits the data via LAN cable 244 to Ethernet switch 236, which aggregates data and routes data back to server 212 in accordance with the present invention.

As noted above, EOAN NOC 76 may also manage nodes in EOAN system 1 remotely. Accordingly, Ethernet switch 208 can request data from Ethernet switch 238 remotely. For example, a system administrator may use a network management browser-type application (e.g., ExtremeWare Vista, etc.) to monitor the performance of specific switches in EOAN system 1. The system administrator contacts server 212 remotely via a plurality of remote access methods, such as Telnet, SSH2, SNMP, browser-based, device management software (e.g., Extreme Networks ExtremeWare Vista), etc. and sends a request for data via LAN cable 224 to Ethernet switch 208, which routes data via LAN cable 220 to optical switch 206, which converts electrical signals to optical signals, multiplexes the optical signals, and sends the data via, for example, a dedicated channel on transmitting fiber 216 via fiber optic ring 100. Fiber optic ring 100 routes the data via a dedicated channel on receiving fiber 254 to optical switch 234, which de-multiplexes the optical signals, converts optical signals to electrical signals and transmits the data via LAN cable 246 to Ethernet switch 238, which calls data and routes data back to server 212 in accordance with the present invention.

It should be noted that in accordance with the present invention end-to-end Ethernet connectivity is maintained because EOAN fiber ring 100 and the optical switches desirably are Layer 1 specific and transparent within the system. Thus, as noted above, the optical switches (e.g., optical switches 206 and 232-234) preferably are used to simply transmit raw bits over a dedicated channel at the physical layer.

As further illustrated in FIG. 4, a user (such as user 228, etc.) may place a telephone call via, for example, a dedicated channel via EOAN system 1. For example, in order for user 228 to make a telephone call, user 228 sends voice data via LAN cable 240 to Ethernet switch 236, which routes the voice data via LAN cable 244 to optical switch 232. Optical switch 232 converts electrical signals to optical signals, multiplexes the optical signals, and transmits the voice data via a dedicated channel on transmitting fiber 248 via EOAN fiber ring 100, which sends the voice data via a dedicated channel on receiving fiber 218 to optical switch 206 in EOAN NOC 76. Optical switch 206 in turn de-multiplexes the optical signals, converts the optical signals to electrical signals, and transmits the voice data via LAN cable 220 to Ethernet switch 208, which routes voice data via LAN cable 222 to PBX switch 210. PBX switch 210 then converts the voice data using a suitable telecommunication protocol and sends the voice data via LAN cable 222 to Ethernet switch 208, which routes the voice data via LAN cable 220 to optical switch 206, which converts electrical signals to optical signals, multiplexes the optical signals, and transmits the voice data preferably via a dedicated channel on transmitting fiber 216 via fiber optic ring 100, which transmits the voice data in accordance with the telecommunication protocol to central office 12, which de-multiplexes the optical signals, converts the optical signals to electrical signals, and connects the telephone call via PSTN 50 (the use of the telecommunication protocol and dedicated channels of fiber optic ring 100 for such purposes has been previously described).

In an alternate embodiment of the present invention, PBX switch 210 may also be coupled directly to central office 12 via a fiber optic cable or other connection. Thus, PBX switch 210 may route voice data to central office 12 without transmitting the voice data across EOAN fiber ring 100. For instance, for user 228 to make a telephone call, user 228 may transmit voice data to PBX switch 210 in accordance with the description in the previous example. Upon receipt of the voice data, PBX switch 210 then converts the voice data using a suitable telecommunication protocol and routes the voice data in accordance with the telecommunication protocol to central office 12, which connects the telephone call via PSTN 50.

In accordance with the present invention, the data of a plurality of users may be sent over the same or dedicated channels while keeping the data of these users separate. Through the management system in EOAN NOC 76, EOAN system 1 can provide consistent QoS and Class of Service (COS) to customers and users, securing transmission quality and bandwidth for applications, such as IP multicasting, IP unicasting, VoIP, streaming video, etc.

Figure 5:
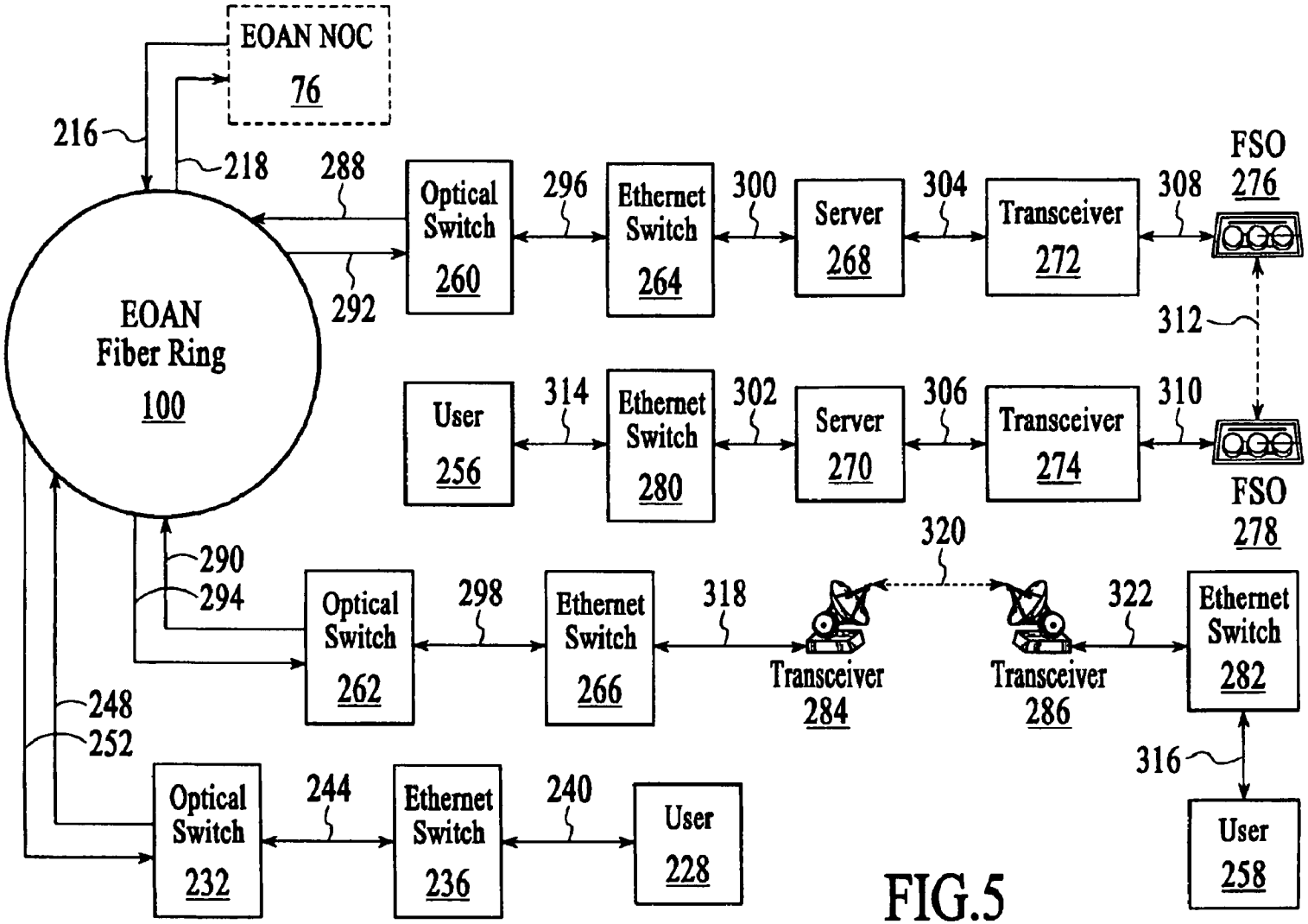
FIG. 5 is a diagram illustrating client architecture for an EOAN system in accordance with a preferred embodiment of the present invention.

FIG. 5 is a diagram illustrating an exemplary embodiment of a client architecture for an EOAN system 1. In accordance with the present invention, a plurality of users (such as user 228, users 256-258, etc.) may connect to EOAN fiber ring 100 via a network architecture that includes a plurality of transmission methods, such as FSO transmissions, microwave signals, fiber optic cables, etc. EOAN NOC 76 provides data switching and management functions as described above in conjunction with FIG. 4. Fiber ring 100 connects a plurality of users, facilities, and/or devices and has the properties such as described in conjunction with FIG. 3A. Users (such as user 228, users 256-258, etc.) are preferably single businesses and may include users, servers, switches, telephones, and/or other devices necessary for voice and data communications in a LAN or other data network. Such equipment may include legacy technology.

In accordance with the present invention, a plurality of data transmission equipment, such as FSO devices (e.g., FSO 276-278, etc.) and transceivers (e.g., transceivers 284-286, etc.), may be implemented at the client's site in order to provide data communications between users, facilities, and/or devices. Preferably FSO 276-278 are either P2P or P2M laser devices that support Ethernet signaling natively and provide a continuous optical connection. Transceivers 284-286 preferably transmit/receive microwave signals to and from users, transceivers, and/or other radio towers via P2P or P2M delivery methods. Optical switches 232 and 260-262 preferably are WDM or DWDM optical switches (such as Ciena Multiwave Metro, etc.), which can support a plurality of protocols (Ethernet, SONET, ATM, etc.) and interface rates (OC-3, OC-12, OC-48, OC-192, etc.) on each optical fiber. Ethernet switches 236, 264-266 and 280-282 preferably are intelligent Ethernet switches (such as Extreme Networks Summit 4, etc.), which are Layer 2 switches that are Layer 3 aware, and designed for customer premise and short-haul fiber ring applications. Fibers, optical switch and Ethernet switches have the same properties as described in conjunction with FIG. 4. Servers 268-270 (such as Unix server, Windows NT, Linux, etc.) preferably control and manage the transceivers. LAN cables 240, 244, 296-306, 314-318, and 322 preferably are standard LAN cables (e.g., CAT5 cable for Ethernet, etc.). Furthermore, as noted in conjunction with FIG. 4, Ethernet switches at client sites, such as Ethernet switches 236-238, etc., may be managed directly via a terminal or remotely via a plurality of remote access methods, such as Telnet, SSH2, SNMP, browser-based, device management software (e.g., Extreme Networks ExtremeWare Vista), etc.

In order for one or more users (such as user 228, users 256-258, etc.) to connect via optical fiber to EOAN fiber ring 100, the client architecture preferably includes one or more Ethernet switches (such as Ethernet switches 236, 264-266, etc.), one or more optical switches (such as optical switches 232 and 260-263, etc.), and a plurality of network cabling (such as LAN cables, optical fibers, etc.). For example, user 228 requires at a minimum Ethernet switch 236, LAN cable 240, optical switch 232, and fibers 248 and 252 to connect to EOAN fiber ring 100. It should be noted that optical switches 232 and 260-262 are connected to EOAN fiber ring 100 via one or more pairs of optical fibers from a fiber grouping (e.g., a fiber optical lateral arrangement, such as previously described).

In accordance with a preferred embodiment of the present invention, users may communicate bi-directionally with each other (i.e., exchange data, send e-mail, make telephone calls, etc.) through EOAN fiber ring 100 via fiber optic transmission media, such as described earlier.

As illustrated in FIG. 5, in accordance with an alternate preferred embodiment of the present invention, client architecture of EOAN system may connect to one or more fiber optic rings via FSO technology. In order for one or more users (such as user 256) to connect via FSO technology, the client architecture preferably includes one or more Ethernet switches (such as Ethernet switches 264 and 280), one or more optical switches (such as optical switch 260), a plurality of servers (such as servers 268-270), a plurality of transceivers (such as transceivers 272-274), a plurality of FSO devices (such as FSO 276-278), and a plurality of network cabling (such as LAN cables 300-306, etc.). As will be apparent to one skilled in the art, servers (the servers primarily existing to service the transceivers and FSO devices, as will be understood by those of skill in the art), transceivers, and FSO devices must be implemented in pairs in accordance with the present invention. For example, user 256 may be connected via LAN cable 314 to Ethernet switch 280, which is connected via LAN cable 302 to server 270, which is coupled via LAN cable 306 to transceiver 274. Transceiver 274 is connected via cable 310 to FSO 278, which transmits/receives optical signals 312 to and from FSO 276, which is coupled via cable 308 to transceiver 272, which is coupled via LAN cable 304 to server 268, which in turn is coupled via LAN cable 300 to Ethernet switch 264, which is connected via LAN cable 296 to optical switch 260, which is connected via optical fibers 288 and 292 to EOAN fiber ring 100. In accordance with the present invention, users may communicate bi-directionally with each other via, for example, dedicated channels via FSO technology.

It should be noted that in a preferred embodiment of the present invention, a server (e.g., server 270), transceiver (e.g., transceiver 274), and FSO device (e.g., FSO 278) may be integrated in a plurality of combinations as proprietary equipment (such as Terabeam models 4200, 5200, 6200, etc.). Thus, network cabling, such as cables 308-310, may include cabling for proprietary equipment (such as USB, serial, Ethernet, etc.). What is important is that, in accordance with such embodiments, a FSO link is provided to connect a user such as user 256 to the EOAN system.

As further illustrated in FIG. 5, in accordance with an alternate preferred embodiment of the present invention, a client architecture of an EOAN system may connect to one or more fiber optic rings via microwave technology. In order for one or more users (such as user 258) to connect via microwave signals to EOAN fiber ring 100, the client architecture preferably includes one or more optical switches (such as optical switch 262), one or more Ethernet switches (such as Ethernet switch 266 and 282), two or more microwave transceivers (such as transceivers 284-286), and a plurality of network cabling (such as LAN cables 298 and 318, etc.). For example, user 258 may be connected via LAN cable 316 to Ethernet switch 282, which is coupled via LAN cable 322 to transceiver 286. Transceiver 286 transmits/receives microwave signals to and from transceiver 284, which is connected via LAN cable 318 to Ethernet switch 266, which is connected via LAN cable 298 to optical switch 262, which is coupled via fibers 290 and 294 to EOAN fiber ring 100. In accordance with the present invention, users may communicate bi-directionally with each other via, for example, dedicated channels via microwave technology.

In accordance with the present invention, users may communicate bi-directionally with each other (i.e., exchange data, send e-mail, make telephone calls, etc.) through EOAN fiber ring 100 via FSO devices. For instance, in order for user 228 to transmit data to user 256, user 228 preferably sends data via LAN cable 240 to Ethernet switch 236, which routes data via LAN cable 244 to optical switch 232, which converts electrical signals to optical signals, multiplexes the optical signals, and sends the data via, for example, a dedicated channel on transmitting fiber 248 via fiber optic ring 100. Fiber optic ring 100 routes the optical signals via a dedicated channel on receiving fiber 218 to EOAN NOC 76, which routes the data according in accordance with operations such described above in conjunction with FIG. 4. EOAN NOC 76 routes the optical signals via, for example, a dedicated channel on transmitting fiber 216 via EOAN fiber ring 100, which sends the optical signals to optical switch 260 via, for example, a dedicated channel on receiving fiber 292. Optical switch 260 de-multiplexes the optical signals, converts the optical signals to electrical signals, and sends the data via LAN cable 296 to Ethernet switch 264, which routes the data via LAN cable 300 to server 268, which sends data via LAN cable 304 to transceiver 272, which transmits data via network cabling 308 to FSO 276, which transmits optical signals 312 to FSO 278, which then sends the data via network cabling 310 to transceiver 274, which transmits data via LAN cable 306 to server 270, which sends data via LAN cable 302 to Ethernet switch 280, which routes data via LAN cable 314 to user 256.

In accordance with the present invention, users may communicate bi-directionally with each other (i.e., exchange data, send e-mail, make telephone calls, etc.) through EOAN fiber ring 100 via microwave technology. For instance, in order for user 228 to transmit data to user 258, user 228 preferably sends data via LAN cable 240 to Ethernet switch 236, which routes data via LAN cable 244 to optical switch 232, which converts electrical signals to optical signals, multiplexes the optical signals, and sends the data via, for example, a dedicated channel on transmitting fiber 248 via fiber optic ring 100. Fiber optic ring 100 routes the optical signals via a dedicated channel on receiving fiber 218 to EOAN NOC 76, which routes the data according in accordance with operations such as described above in conjunction with FIG. 4. EOAN NOC 76 routes the optical signals via, for example, a dedicated channel on transmitting fiber 216 via EOAN fiber ring 100, which sends the optical signals to optical switch 262 via a dedicated channel on receiving fiber 294. Optical switch 262 de-multiplexes the optical signals, converts the optical signals to electrical signals, and sends the data via LAN cable 298 to Ethernet switch 266, which routes the data via LAN cable 318 to transceiver 284, which converts optical signals to microwave signals and transmits the data via microwave signals 320 to transceiver 286, which converts microwave signals to optical signals and sends the data via LAN cable 322 to Ethernet switch 282, which in turn routes data via LAN cable 316 to user 258.

As further illustrated in FIG. 5, one or more users (such as user 228, etc.) may transmit data to one or more users (such as user 258, etc.) via, for example, dedicated channels via EOAN system 1. For example, user 228 may transmit data to users 256-258, and user 256 may transmit data to user 228 and 258, and user 258 may transmit data to user 228 and user 256. In accordance with the present invention, users may communicate bi-directionally with each other via, for example, dedicated channels via a plurality of technologies on EOAN system 1 (alternatively, VLAN/VMAN frame tags and the like may be utilized to segregate user data, while also implementing EOAN system 1 with a plurality of types of transmission types for connecting remote users to the fiber optic ring of the EOAN system, etc.).

It should be noted that while EOAN system 1 can involve the exchange of digital data at 100 Mbps, 1 Gbps, and 10 Gbps, EOAN system 1 can also use other, slower data rates (e.g., 1200 bps, 2400 bps, 9600 bps, 14.4 Kbps, etc.). Thus, EOAN system 1 is not limited to high-speed data rates, but can also communicate at data rates commensurate with the type of data being transmitted/received, the type of service being provided, the quality of service needed, etc.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. An method for operating an Ethernet Optical Area Network ("EOAN") extending over one or more metropolitan areas, comprising the steps of:

providing a fiber optic ring;

providing at least a first user facility coupled to the fiber optic ring, wherein the first user facility is coupled to the fiber optic ring via first and second Ethernet switches, first and second wireless transceivers and a first optical switch/multiplexer, wherein the first user facility is connected to the first Ethernet switch, and the first Ethernet switch is connected to the first wireless transceiver;

communicating signals wirelessly between the first wireless transceiver and the second wireless transceiver, wherein the second wireless transceiver is connected to the second Ethernet switch, the second Ethernet switch is connected to the first optical switch/multiplexer, and the first optical switch/multiplexer is connected to the fiber optic ring;

providing at least a second user facility coupled to the fiber optic ring, wherein the second user facility is coupled to the fiber optic ring via third and fourth Ethernet switches, third and fourth wireless transceivers and a second optical switch/multiplexer, wherein the second user facility is connected to the third Ethernet switch, and the third Ethernet switch is connected to the third wireless transceiver;

communicating signals wirelessly between the third wireless transceiver and the fourth wireless transceiver, wherein the fourth wireless transceiver is connected to the fourth Ethernet switch, and the fourth Ethernet switch is connected to the second optical switch/multiplexer, and the second optical switch/multiplexer is connected to the fiber optic ring;

coupling network management control information via a network operation center ("NOC") to and from the fiber optic ring, wherein the NOC is coupled to the fiber optic ring via a third optical switch/multiplexer and a fifth Ethernet switch, wherein a server is connected to the fifth Ethernet switch, the first Ethernet switch is connected to the third optical switch/multiplexer, and the third optical switch/multiplexer is connected to the fiber optic ring;

wherein the NOC includes a network management application running on the server for remotely managing the EOAN, the method further comprising the step of providing network management control information to the first, second, third, fourth and fifth Ethernet switches, wherein data is communicated between the first and second user facilities via a communication path directed by the first, second, third, fourth and fifth Ethernet switches based on the provided network management control information, wherein end-to-end Ethernet data communications are provided between the first and second facilities using an Ethernet protocol.

2. The method of claim 1, wherein the NOC sends network management commands to the Ethernet switches, wherein the network management commands allocate bandwidth between types of data communications over the fiber optic ring.

3. The method of claim 2, wherein voice communications are given a higher priority for data transmission over the fiber optic ring as compared to computer data communications.

4. The method of claim 3, wherein a predetermined level of Quality of Service (QoS) is provided for voice communications over the fiber optic ring.

5. The method of claim 1, wherein data is transmitted through the fiber optic ring using a plurality of wavelengths of light, wherein each wavelength provides a channel for data transmission via the fiber optic ring.

6. The method of claim 1, wherein data communications from the first user facility to the second user facility are routed to the NOC via the fiber optic ring and subsequently routed to the second user facility from the NOC via the fiber optic ring.

7. The method of claim 1, wherein voice data communications are transmitted via the fiber optic ring, wherein a particular voice data communication is transmitted from the first user facility to the NOC via an Ethernet protocol, wherein the NOC processes the particular voice data communication in accordance with a telecommunications protocol, wherein the NOC transmits the particular voice data communication to a telephone company central office, wherein the telephone company central office connects the particular voice data communication to a remote user facility.

8. The method of claim 7, wherein the NOC transmits the particular voice data communication to the telephone company central office via a communication facility separate from the fiber optic ring.

9. The method of claim 7, wherein the NOC transmits the particular voice data communication to the telephone company central office via the fiber optic ring.

10. The method of claim 9, wherein data is transmitted through the fiber optic ring using a plurality of wavelengths of light, wherein each wavelength provides a channel for data transmission via the fiber optic ring, wherein one or more predetermined channels for data transmission are dedicated for communications with the telephone company central office via the fiber optic ring.

11. The method of claim 10, wherein at least a first channel for data transmission via the fiber optic ring is dedicated for communications with the telephone company central office via a telecommunications protocol, wherein at least a second channel for data transmission via the fiber optic ring is dedicated for communications between user facilities or other facilities coupled to the fiber optic ring via an Ethernet protocol.

12. The method of claim 1, wherein the EOAN comprises a plurality of fiber optic rings that are interconnected.

13. The method of claim 12, wherein at least a first fiber optic ring is interconnected with a second fiber optic ring, wherein the first fiber optic ring is coupled to user facilities and other facilities in a first municipality, and wherein the second fiber optic ring is coupled to user facilities and other facilities in a second municipality.

14. The method of claim 13, wherein a NOC coupled to the first fiber optic ring controls routing of data communications via the first and second fiber optic rings.

15. The method of claim 13, wherein data communications occur within and between the first and second municipalities in accordance with an Ethernet protocol.

16. The method of claim 12, wherein the first fiber optic ring is interconnected with the second fiber optic ring via a common NOC, a long-haul fiber connection, a microwave-based connection, or a free space optic connection.

17. The method of claim 1, wherein the first user transmits data to the fiber optic ring at least in part using a free space optic data transmission, wherein the second user transmits data to the fiber optic ring at least in part using a microwave data transmission, wherein a third user transmits data to the fiber optic ring at least in part using a fiber optic data transmission but not a free space optic data transmission or a microwave data transmission.

18. The method of claim 1, wherein the fiber optic ring comprises one or more pairs of fiber optics, wherein a first fiber of at least one pair of fibers transmits data in both directions around the fiber optic ring, wherein a second fiber of the at least one pair of fibers transmits in both directions around the fiber optic ring opposite the first direction.

19. The method of claim 18, wherein data transmissions may occur via the first direction or the second direction, wherein a redundant path for data transmissions via the fiber optic ring is provided.

20. The method of claim 18, wherein the fiber optic ring comprises a self-healing fiber optic ring.

*21. An method for managing a network extending over two or more geographic locations, comprising the steps of:*

*providing a fiber optic topology at a first geographic location, wherein the fiber optic network topology comprises two or more optical Ethernet switches interconnected with fiber optic cable, and wherein the fiber optic network topology is coupled to a wireless network topology via an optical Ethernet switch;*

*providing a wired Ethernet network topology located at a second geographic location, wherein the wired Ethernet network topology comprises two or more wired Ethernet switches interconnected with Ethernet wiring, and wherein the wired Ethernet network topology is coupled to the wireless network topology via a wired Ethernet switch;*

*communicating signals between the fiber optic network topology at the first geographic location and the wired Ethernet network topology located at the second geographic location via the optical Ethernet switch, the wireless network topology, and the wired Ethernet switch;*

*providing network management control information from a network operation center (NOC) to the fiber optic topology and the wired Ethernet topology;*

*wherein end-to-end data communications are provided between the first and second geographic locations via a communication path comprising the wireless network topology, wherein the communications path is directed by the the optical Ethernet switch and the wired Ethernet switch based on the provided network management control information.*

*22. The method of claim 21, wherein the NOC sends network management commands to the fiber optic topology and the wired Ethernet topology, wherein the network management commands allocate bandwidth between types of data communications.*

*23. The method of claim 22, wherein voice communications are given a higher priority for data transmission as compared to data communications.*

*24. The method of claim 23, wherein a predetermined level of Quality of Service (QoS) is provided for voice communications.*

*25. The method of claim 21, wherein data is transmitted over the fiber optic topology using a plurality of wavelengths of light, wherein each wavelength provides a channel for data transmission.*

*26. The method of claim 21, wherein data communications from the first geographical location to the second geographical location are routed to the NOC via the fiber optic topology and subsequently routed to the second geographical location from the NOC via the wired Ethernet topology.*

*27. The method of claim 21, wherein a voice communication is transmitted from the first geographic location to the NOC via an Ethernet protocol, wherein the NOC processes the voice in accordance with a telecommunications protocol, wherein the NOC transmits the voice communication to a telephone company central office, wherein the telephone company central office connects the voice communication to a remote user facility.*

*28. The method of claim 27, wherein the NOC transmits the voice communication to the telephone company central office via a communication facility distinct from the fiber optic topology.*

*29. The method of claim 27, wherein the NOC transmits the voice communication to the telephone company central office via the fiber optic topology.*

*30. The method of claim 29, wherein data is transmitted through the fiber optic topology using a plurality of wavelengths of light, wherein each wavelength provides a channel for data transmission via the fiber optic topology, wherein one or more predetermined channels for data transmission are dedicated for communications with the telephone company central office via the fiber optic topology.*

*31. The method of claim 30, wherein at least a first channel for data transmission via the fiber optic topology is dedicated for communications with the telephone company central office via a telecommunications protocol, wherein at least a second channel for data transmission via the fiber optic topology is dedicated for communications between user facilities coupled to the fiber optic topology via an Ethernet protocol.*

*32. The method of claim 31, wherein the fiber optic topology comprises at least a first fiber optic ring interconnected with a second fiber optic ring.*

*33. The method of claim 32, wherein the first fiber optic ring is coupled to user facilities at the first geographic location and wherein the second fiber optic ring is coupled to user facilities at a third geographic location.*

*34. The method of claim 33, wherein a NOC coupled to the first fiber optic ring controls routing of data communications via the first and second fiber optic rings.*

*35. The method of claim 33, wherein data communications occur within and between the user facilities at the first and third geographic locations in accordance with an Ethernet protocol.*

*36. The method of claim 32, wherein the first fiber optic ring is interconnected with the second fiber optic ring via a common NOC, a long-haul fiber connection, a microwave-based connection, or a free space optic connection.*

*37. The method of claim 31, wherein a first user transmits data to the fiber optic topology at least in part using a free space optic data transmission, wherein a second user transmits data to the fiber optic topology at least in part using a microwave data transmission, wherein a third user transmits data to the fiber optic topology at least in part using a fiber optic data transmission but not a free space optic data transmission or a microwave data transmission.*

*38. The method of claim 31, wherein the fiber optic cable comprises one or more pairs of fiber optics, wherein a first fiber of at least one pair of fibers transmits data in both directions around the fiber optic topology, wherein a second fiber of the at least one pair of fibers transmits in both directions around the fiber optic topology opposite the first direction.*

*39. The method of claim 38, wherein data transmissions may occur via the first direction or the second direction, wherein a redundant path for data transmissions via the fiber optic topology is provided.*

*40. The method of claim 38, wherein the fiber optic topology comprises a self-healing fiber optic ring.*

*41. A method for operating an Ethernet Optical Area Network ("EOAN") extending over one or more metropolitan areas, comprising the steps of:*

*transmitting data via a fiber optic ring;*

*coupling data to/from at least a first user facility coupled to the fiber optic ring at least in part via a first Ethernet switch and a first wireless transceiver;*

*coupling data to/from at least a second user facility coupled to the fiber optic ring at least in part via a second Ethernet switch and a second wireless transceiver;*

*coupling network management control information via a network operation center ("NOC") to and from the fiber optic ring, wherein the NOC is coupled to the fiber optic ring at least in part via a third Ethernet switch, wherein a server is connected to the third Ethernet switch;*

*wherein the NOC includes a network management application running on the server for remotely managing the EOAN, the method further comprising the step of providing network management control information to the first, second and third Ethernet switches, wherein data is communicated between the first and second user facilities via a communication path directed by the first, second and third Ethernet switches based on the provided network management control information, wherein end-to-end Ethernet data communications are provided between the first and second facilities using an Ethernet protocol.*

* * * * *